US010292368B1

(12) United States Patent
Pierog

(10) Patent No.: US 10,292,368 B1
(45) Date of Patent: May 21, 2019

(54) ANIMAL LEASH AND COSTUME KIT

(71) Applicant: Jessica Pierog, Irvine, CA (US)

(72) Inventor: Jessica Pierog, Irvine, CA (US)

( * ) Notice: Subject to any disclaimer, the term of this patent is extended or adjusted under 35 U.S.C. 154(b) by 0 days.

(21) Appl. No.: 16/048,253

(22) Filed: Jul. 28, 2018

Related U.S. Application Data

(60) Provisional application No. 62/644,057, filed on Mar. 16, 2018.

(51) Int. Cl.
*A01K 27/00* (2006.01)
*A01K 13/00* (2006.01)

(52) U.S. Cl.
CPC .......... *A01K 27/005* (2013.01); *A01K 13/006* (2013.01); *A01K 27/002* (2013.01); *A01K 27/003* (2013.01)

(58) Field of Classification Search
CPC .... A01K 27/006; A01K 11/00; A01K 27/001; A01K 27/002; A01K 27/005; A01K 27/00; A01K 27/003; A01K 27/008
USPC ....... 119/858, 863, 856, 864, 792, 793, 795; D30/152, 145
See application file for complete search history.

(56) References Cited

U.S. PATENT DOCUMENTS

| | | | | |
|---|---|---|---|---|
| 5,291,856 A * | 3/1994 | Goller | ................. | A01K 27/003 119/795 |
| 5,363,809 A * | 11/1994 | Roe | ........................ | A01K 23/00 119/792 |
| 5,467,743 A * | 11/1995 | Doose | ................. | A01K 27/001 119/858 |
| 5,743,216 A * | 4/1998 | Holt, Jr. | ............... | A01K 27/002 119/793 |
| 5,794,572 A * | 8/1998 | Saunders | ............. | A01K 27/006 119/858 |
| 6,374,778 B1 * | 4/2002 | Glussich | ................ | A01K 11/00 119/859 |
| 6,422,177 B1 * | 7/2002 | Noguero | ............. | A01K 27/006 119/856 |
| 6,662,755 B2 * | 12/2003 | Kato | .................... | A01K 13/006 119/856 |
| 7,066,113 B2 * | 6/2006 | Cheng | .................. | A01K 27/001 119/863 |
| 7,267,081 B2 * | 9/2007 | Steinbacher | ......... | A01K 27/006 119/858 |
| 7,421,980 B1 * | 9/2008 | Ehlers | .................. | A01K 27/006 119/858 |
| 7,877,844 B2 * | 2/2011 | Nichols | ................. | A01K 11/00 119/858 |

(Continued)

*Primary Examiner* — Yvonne R Abbott-Lewis
(74) *Attorney, Agent, or Firm* — Jafari Law Group, Inc.

(57) ABSTRACT

The invention generally relates to a kit useful for making dogs and people less anxious and for allowing costumed animals to easily be controlled with a leash. The kit may include a leash attachment apparatus, a pressure-applying harness, and a collar concealer. The leash attachment may include a body with a cavity having an opening at a first terminal end of the body, the opening configured to receive a terminal end of a leash; a ring coupled to a tubular elongated aperture situated at a second terminal end of the body, the tubular elongated aperture oriented perpendicular to the opening on the first terminal end of the body; and a costume coupler hingely attached to a side wall of the body adjacent to the opening and the ring, wherein the costume coupler comprises an attachment means disposed along an inner surface of the costume coupler for securing to a costume.

20 Claims, 36 Drawing Sheets

(56) References Cited

U.S. PATENT DOCUMENTS

| | | | | |
|---|---|---|---|---|
| D699,403 S | * | 2/2014 | Holterhaus | D30/145 |
| 2009/0090308 A1 | * | 4/2009 | Nicholson | A01K 27/006 119/858 |
| 2010/0277943 A1 | * | 11/2010 | Hurwitz | A01K 27/006 362/555 |
| 2016/0262353 A1 | * | 9/2016 | Arnold | A01K 27/003 |

* cited by examiner

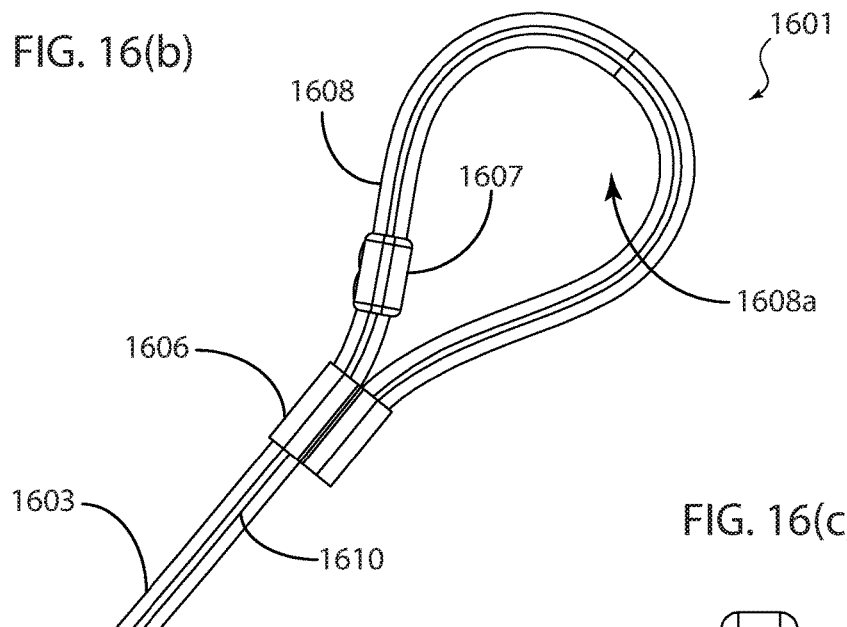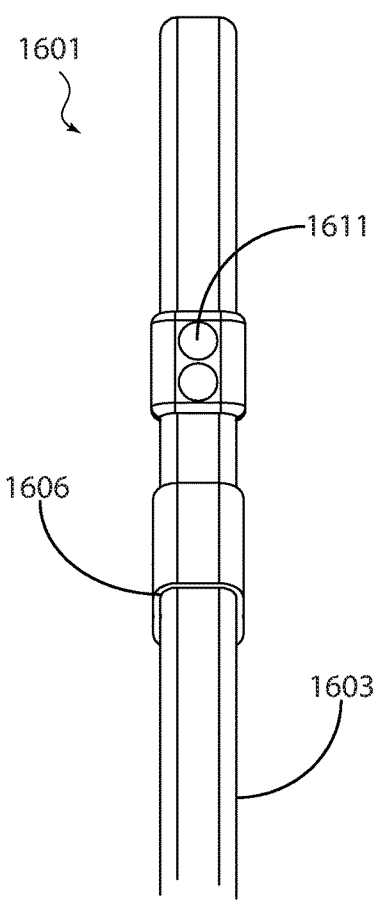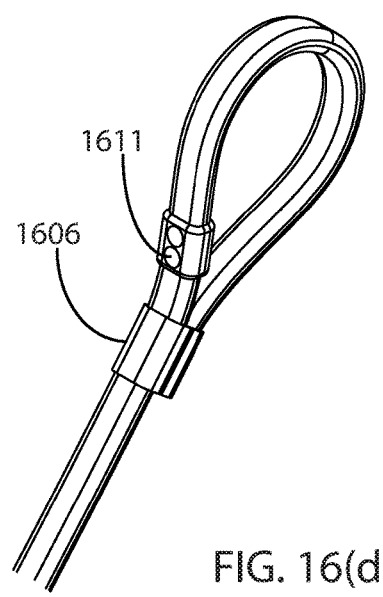

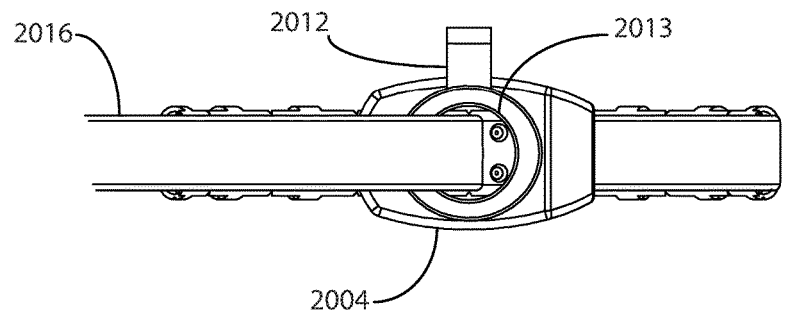
FIG. 20(c)
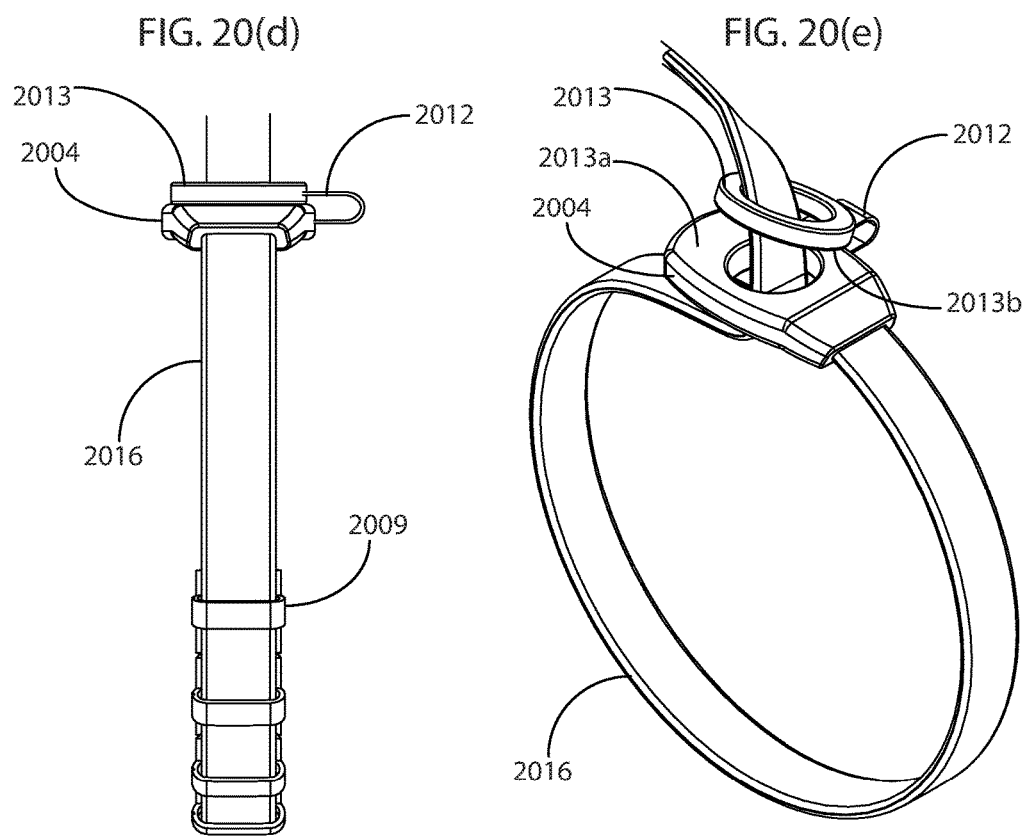
FIG. 20(d)
FIG. 20(e)

FIG. 22(a)
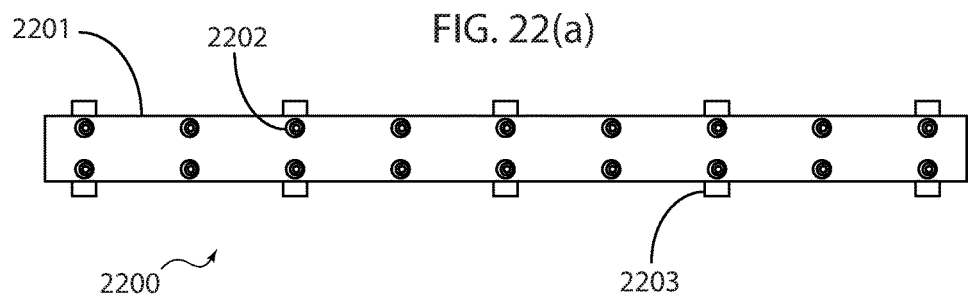
FIG. 22(b)
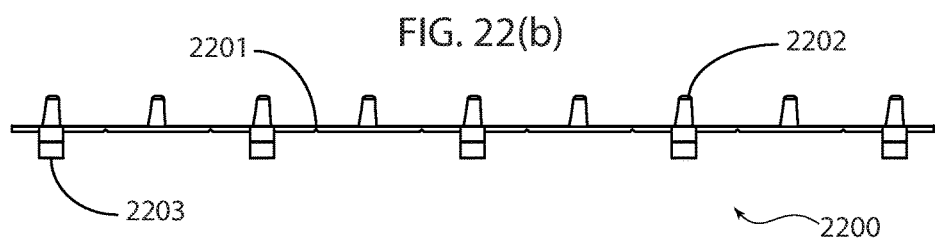
FIG. 22(c)
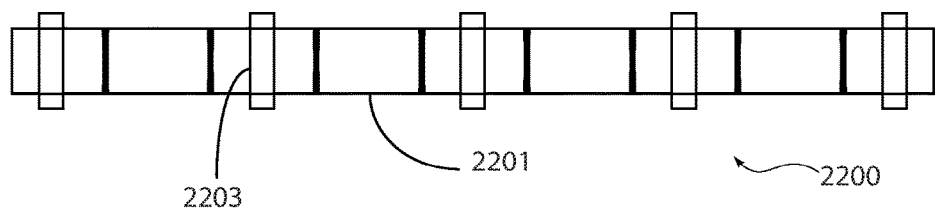
FIG. 22(d)     FIG. 22(e)
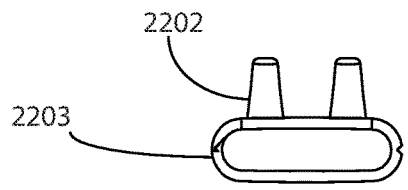 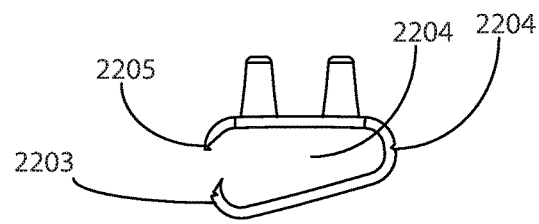

ANIMAL LEASH AND COSTUME KIT

PRIORITY NOTICE

The present application claims priority under 35 U.S.C. § 119(e) to U.S. Provisional Patent Application Ser. No. 62/644,057 filed on Mar. 16, 2018, the disclosure of which is incorporated herein by reference in its entirety.

TECHNICAL FIELD OF THE INVENTION

The present invention relates generally to leashes for animals. More specifically, the present disclosure relates to a kit used to make animals and people less anxious, to allow people to easily attach a leash to a costumed animal, and to conceal collars that may cause people to be afraid of the animal. More specifically, the kit includes a leash attachment apparatus, a pressure-applying harness, and a collar concealer.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Clothing for animals has been around for many years. In fact, the prior art is rife with disclosures discussing variations of these entertaining devices. Some wearable pieces include full-body wraps, while others only provide half-body wraps. Some devices double as diapers that make cleaning up animal waste simpler. Yet other similar costumes merely function as objects of entertainment. Animals wearing body wraps have demonstrated improved athletic performance, focus and concentration in training classes, and friendliness toward other animals and people. Body wraps also help reduce the motion sickness, touch sensitivity, antisocial behavior, and the effects of trauma.

The prior art, however, has several shortcomings. One problem is that putting an animal into a costume makes it difficult to also attach a leash to the animal. Typically, this limitation is due to the way the costume covers the area where a leash would attach. Yet another problem with conventional animal costumes or clothing is that the clothing fails to provide anything other than entertainment for those people who see the costumed animal; for example, costumes for animals may provide their owners with entertainment, but these prior art costumes do not calm the animal or provide the animal with anxiety relief in situations the animal finds stressful. Additionally, prior art leashes tend to visually detract from the creativity, ambience and overall look of the costume.

Accordingly, there is an unanticipated or inadequately addressed need for an improved animal costume that facilitates putting a leash on a costumed animal. Further, there is a need to employ animal clothing that also calms and soothes animals that may feel stress or anxiety in different situations. Additionally, there is a need for a device that securely fastens a collar to a collar concealer.

Therefore, there is a need for a kit employing a leash attachment apparatus, a pressure-applying harness, and a collar concealer, which helps comfort a costumed animal and conceal an animal's collar. It is to these ends that the present invention has been developed.

SUMMARY OF THE INVENTION

To minimize the limitations in the prior art, and to minimize other limitations that will be apparent upon reading and understanding the present specification, the present invention describes a kit for minimizing anxiety in animals as well as people around the animals wearing one or more components of the kit. In exemplary embodiments, the kit may include several elements as will be discussed in turn.

Generally, the invention involves a kit including a leash attachment apparatus, a pressure-applying harness, and a collar concealer that aid in the task of attaching a leash to an animal in such a manner so as to not interfere with a costume worn by the animal, while simultaneously calming said animal. In some embodiments, a device or attachment means may be implemented for attaching decorative elements to said pressure-applying harness without interfering with the leash; the decorative elements help promote a less intimidating presence, especially with larger animals. The leash attachment apparatus may connect to a pressure-applying harness defined by a pair of straps that form a type of suspenders, which allows a user to easily have a costumed animal on a leash.

A leash attachment apparatus, in accordance with some exemplary embodiments of the present invention, may include: a body including a cavity with an opening at a first terminal end of the body, the opening configured to receive a terminal end of a leash; a ring coupled to a tubular elongated aperture situated at a second terminal end of the body, the tubular elongated aperture oriented perpendicular to the opening on the first terminal end of the body; and a costume coupler hingely attached to a side wall of the body, the side wall adjacent to the opening and the ring, wherein the costume coupler comprises an attachment means disposed along an inner surface of the costume coupler for securing a costume portion therein.

A leash system, in accordance with some exemplary embodiments of the present invention, may include: a handle; a leash coupled to the handle at a first terminal end of the leash; and a leash attachment apparatus coupled to a second terminal end of the leash, the leash attachment apparatus, comprising: a body including a cavity with an opening at a first terminal end of the body, the opening configured to receive a terminal end of a leash; a ring coupled to a tubular elongated aperture situated at a second terminal end of the body, the tubular elongated aperture oriented perpendicular to the opening on the first terminal end of the body; and a costume coupler hingely attached to a side wall of the body, the side wall adjacent to the opening and the ring, wherein the costume coupler comprises an attachment means disposed along an inner surface of the costume coupler for securing a costume portion therein.

A leash attachment apparatus, in accordance with some exemplary embodiments of the present invention, may include: a substantially flat body including a cavity with an opening at a first terminal end of the body, the opening configured to receive a terminal end of a flat tubular leash; a ring coupled to a tubular elongated aperture situated at a second terminal end of the body, the tubular elongated aperture oriented perpendicular to the opening on the first terminal end of the body; and a costume coupler including a flap that hingely connects the costume coupler to the body, a first terminal end of the flap attached to the costume coupler and a second terminal end attached to a side wall of the body, the side wall of the body adjacent to the opening and the ring, wherein the costume coupler comprises a first magnetic component disposed along an inner bottom surface and a second magnetic component disposed along an inner top surface.

The leash attachment apparatus may comprise a plurality of closed loops of a size sufficient to allow a leash to easily pass through. The pair of suspenders may include a plurality of fasteners that may allow a costume located on an animal's posterior to connect to the suspenders to provide additional support for the costume. The plurality of fasteners may also serve the purpose of providing pressure on certain areas of the animal so as to soothe and calm the animal. The leash attachment apparatus may also include a decoration attachment apparatus that may allow a decorative piece to be added to the animal's costume without interfering with the leash. In other embodiments, the leash attachment apparatus may implement a single leash loop while other embodiments may implement at least two leash loops. The leash loops may be held in place using any number of devices known in the art, such as but not limited to button snaps, magnets, and Velcro®.

An animal leash and costume kit, in accordance with some exemplary embodiments of the present invention, may include: a pressure-applying harness, including a plurality of straps coupled to a costume; a leash attachment apparatus removably coupled to the pressure-applying harness, formed by a plurality of leash attachment loops adapted to receive a portion of a leash; and a collar concealer vest including a collar fastener for concealing a portion of a collar attached to the collar concealer.

A pressure-applying harness, in accordance with some exemplary embodiments of the present invention, may include: a pair of straps joined at a first end and coupled together with one or more crosspieces, the pair of straps including a second and a third end opposite to the first end, wherein the pair of straps form a harness configured to wrap over the back and underneath of an animal's body; a first, second and third fasteners situated at each of the first, second and third ends; and a costume with corresponding first, second and third fasteners configure to register with the first, second and third fasteners situated at each of the first, second and third ends.

A leash attachment apparatus, in accordance with some exemplary embodiments of the present invention, may include: a horizontal support strap; a first removable attachment loop coupled to the horizontal support strap at a first terminal end; and a second removable attachment loop coupled to the horizontal support strap at a second terminal end, wherein the first and second removable attachment loops are each adapted to receive a portion of a leash.

In a further embodiment of the invention, it is envisioned that a leash attachment apparatus is connected to a first and second strap of a pressure-applying harness so as to be situated on the animal's shoulders. Such a location may allow for the easiest place to attach a leash to the pressure-applying harness while still providing the control associated with leashes. Of course, without limitation, the leash attachment apparatus may also be located on the chest of the animal or further down the animal's back.

In yet another embodiment of the invention, an animal's collar may be hidden from view by using a collar concealer. The collar concealer may be placed over the animal's collar. The collar concealer may be removably attached to the animal's collar by using a collar fastener.

It is an objective of the present invention to provide a pressure-applying harness for animals that will overcome the shortcomings of the prior art devices.

It is another objective of the present invention to provide a leash attachment apparatus for animals that allow a user to easily connect a leash to an animal wearing a costume without disrupting the costume.

It is yet another objective of the present invention to provide a pressure-applying harness for animals that allow additional decorative pieces to be attached to the animal's costume.

It is a further objective of the present invention to provide a pressure-applying harness for animals that places pressure on an animal's muscles so as to swaddle and soothe an anxious or stressed animal.

It is another objective of the present invention to provide a collar concealer that hides an animal's collar from view, thus putting the viewing public more at ease around the animal.

These advantages and features of the present invention are not meant as limiting objectives, but are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. The drawings that accompany the detailed description can be briefly described as follows:

FIG. 16(b)-FIG. 16(d) illustrate a handle of a leash system in accordance with an exemplary embodiment of the present invention.

FIG. 20(a)-FIG. 20(e) illustrate a leash attachment apparatus coupled to a portion of a leash to form a collar for a leash system in accordance with one exemplary embodiment of the present invention.

FIG. 22(a)-FIG. 22(e) illustrate a prong system for a leash system in accordance with one exemplary embodiment of the present invention.

DETAILED DESCRIPTION OF THE INVENTION

Figure 1:
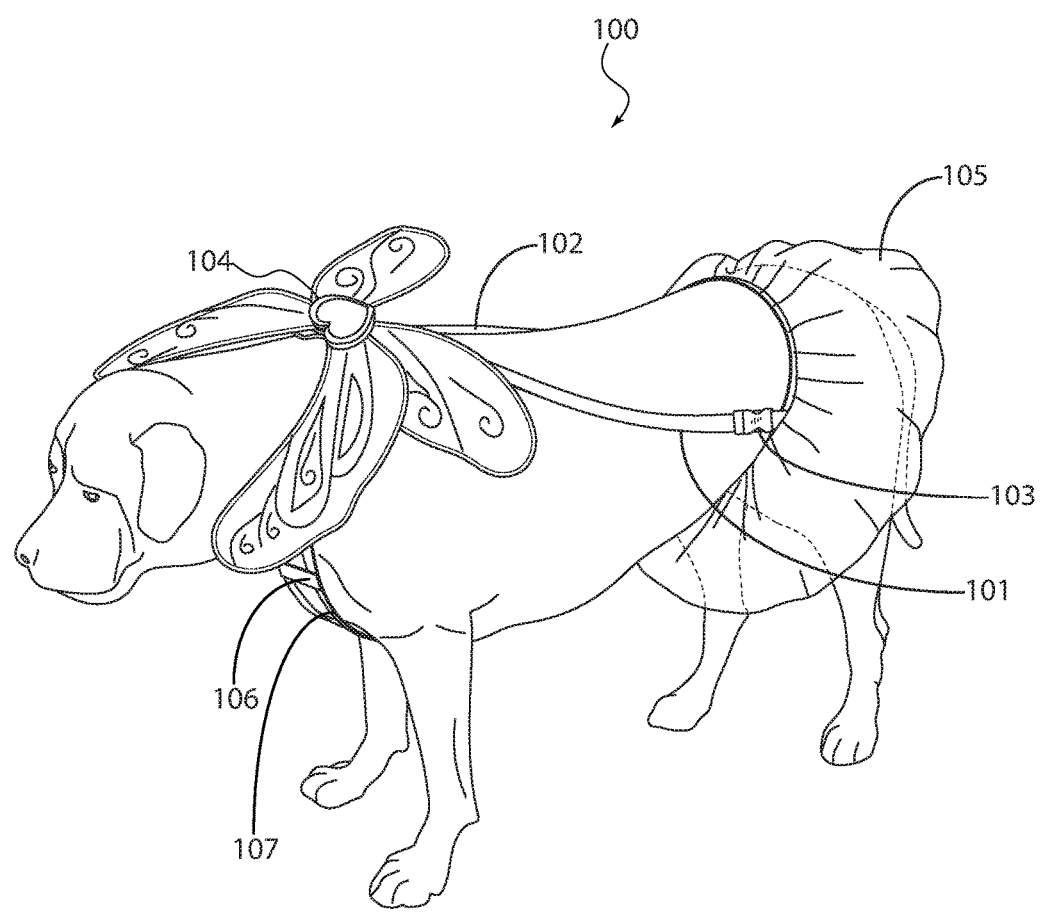
FIG. 1 illustrates a front perspective view of a leash and costume kit with an attached decorative piece in accordance with some exemplary embodiments of the present invention.

In the following discussion that addresses a number of embodiments and applications of the present invention, reference is made to the accompanying figures, which form a part thereof. Depictions are made, by way of illustration, of specific embodiments in which the invention may be practiced; however, it is to be understood that other embodiments may be utilized and changes may be made without departing from the scope of the present invention. Whenever possible, the same reference numbers are used in the drawings and the following description to refer to the same or similar elements.

In the following detailed description, numerous specific details are set forth by way of examples in order to provide a thorough understanding of the relevant teachings. However, it should be apparent to those skilled in the art that the present teachings may be practiced without such details. In other instances, well known structures, components, and/or functional or structural relationship thereof, etc., have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments, whether these features, elements, and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

The present disclosure relates to, among other things, a kit for placing a costume and a leash on an animal. Exemplary embodiments of the present disclosure are described with reference to the drawings for illustration purposes and are not intended to limit the scope of the present disclosure.

Turning now to the figures, FIG. 1 illustrates a front perspective view of a leash and costume kit 100 with an attached decorative piece 104. More specifically, FIG. 1 depicts a leash and costume kit 100, which may comprise: a pressure-applying harness, including a plurality of straps (first strap 101, second strap 102, crosspiece 106 and third strap 107), and a first fastener 103 coupled to a costume 105; a leash attachment apparatus (not visible in this view) coupled to the decorative piece 104, the leash attachment apparatus removably coupled to the pressure-applying harness and formed, as will be discussed in more detail below, by a plurality of leash attachment loops adapted to receive a portion of a leash; and a collar concealer vest (not shown in this figure) including a collar fastener for concealing a portion of a collar attached to the collar concealer.

The first and second straps 101-102 attach to the animal's costume 105 via fasteners in a manner such as to form a type of suspenders that wrap around the shoulders of the animal along a length of the animal's back. In one embodiment of the present invention, there may be three straps wherein the first and second straps 101-102 wrap around the animal's back and a third strap 107 connects to the costume 105 underneath along a length of the animal's stomach. Utilizing the straps in this manner may securely attach the costume 105 to the animal while simultaneously lessening the animal's anxiety by applying soothing pressure to the animal. The straps may also have a first crosspiece 106 that may prevent the first strap 101, the second strap 102, and the third strap 107 from becoming tangled or misplaced. Straps 101, 102, 107 may comprise any material suitable for a harness. For example, and without limitation, the material may be elastic, leather, nylon, other materials known in the art, and or any combination thereof.

In exemplary embodiments of the present invention, straps 101, 102, 107 may include a leash attachment apparatus (as shown in the following FIG. 2) that may allow a decorative piece 104 to be attached to the animal. As mentioned above, the decorative piece aids in minimizing any intimidating impression that the animal may cause on humans. This helps humans relax around the animal, which in turn helps the animal keep a more relaxed demeanor. For example, and without limitation, people seeing a large dog may be afraid that the dog will injure them. This fear may be transferred to the large dog who in turn will become fearful and anxious. The decorative piece 104 (in the shown embodiment shaped like butterfly wings) may reduce the viewing public's anxiety and fear by creating a silly and fun situation. Moreover, although a single decorative piece 104 may be implemented as shown, other decorative pieces may be coupled to other locations of the harness or costume 105 without deviating from the scope of the present invention. For example, costume 105 may include a fastening component such as a Velcro component at a top region of the tutu where other attachable/interchangeable decorative embellishments may be placed. Because each decorative attachment can be adjusted and or interchanged, a user may customize their decorative pieces in a manner that conforms to the comfort, security and or desired look for their pet.

Similarly, costume 105 may include one or more components that is decorative but also functional in this same manner. For example, and without limiting the scope of the present invention, costume 105 may include a tutu. Upon seeing a large dog wearing a ballerina tutu, a person may be less likely to experience anxiety or fear about the approaching dog, and instead the person may experience joviality and happiness. This may have the effect of transferring the positive emotions to the dog wearing the ballerina tutu.

Figure 2:
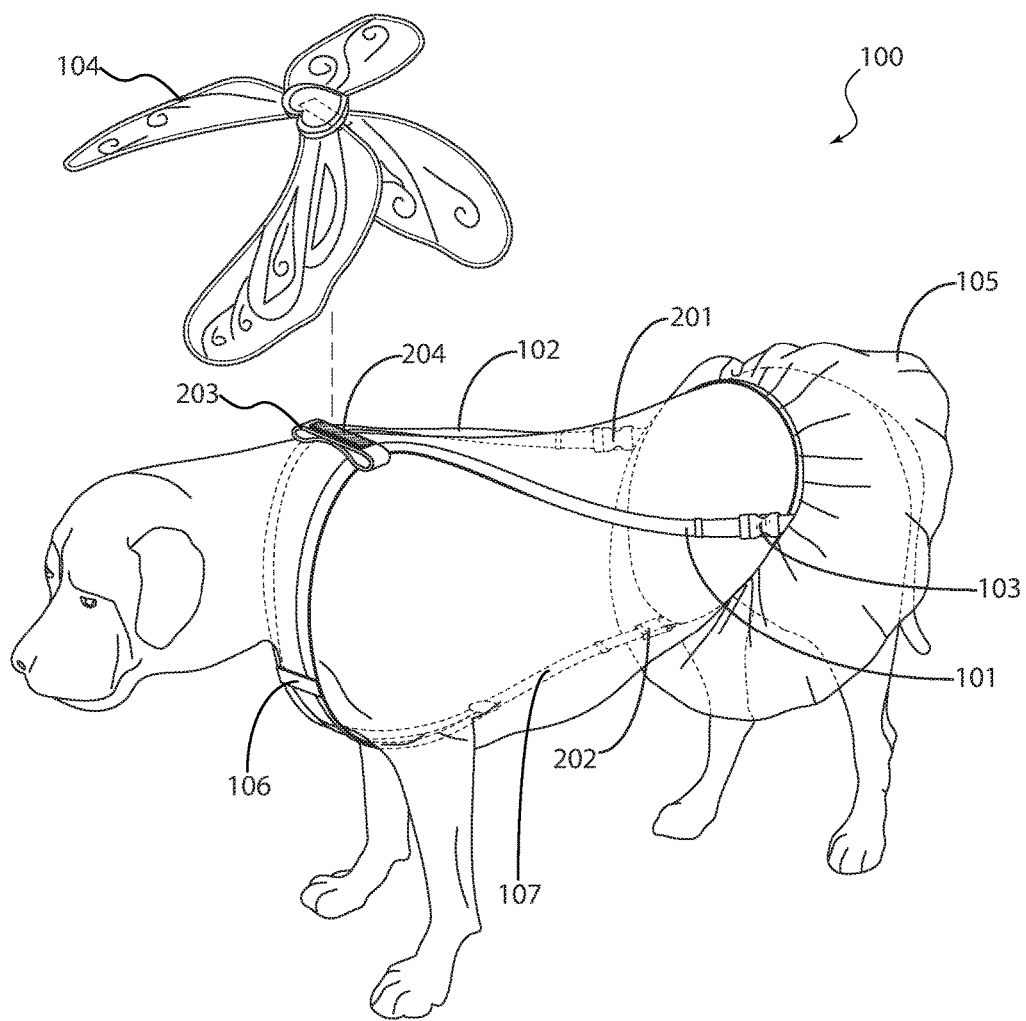
FIG. 2 illustrates an exploded view of a leash and costume kit with a decorative piece removed from a leash attachment apparatus that is connected to a pressure-applying harness, in accordance with some exemplary embodiments of the present invention.

FIG. 2 illustrates an exploded view of a leash and costume kit 100 with a decorative piece 104 removed from a leash attachment apparatus 203 that is connected to a first strap 101, a second strap 102, and a third strap 107. In an exemplary embodiment, a decorative piece 104 may be attached to an upper exterior surface of a leash attachment apparatus 204. Attaching a decorative piece 104 in this manner may allow the leash attachment apparatus 203 to be hidden from view, thus not interfering with the overall flow and look of an animal's costume design.

In another embodiment of the present invention, the three straps 101, 102, 107 may attach to the animal's costume 105 in a plurality of locations through the use of a plurality of fasteners. Of course, any method for fastening straps, such as finger clips, drop clips, alligator clips, trigger snaps, buckles, buttons, Velcro® and or belt attachments, is envisioned by the present invention. It may be advantageous to attach the three straps 101, 102, 107 to the fasteners at three locations on a posterior-based costume 105, such as one attachment on either side of the animal's hips and one attachment near the animal's pelvis. Such an arrangement may allow the three straps 101, 102, 107 to sufficiently stay in place while providing anxiety-reducing pressure to the animal. However, fewer or more fasteners may be used without deviating from the scope of the present invention.

In a further embodiment of the present invention, it is envisioned that a first strap 101 and second strap 201 may be wrapped over the animal's back and attached to a posterior-based costume 105 using a first fastener 103 and a second fastener 201. A third strap 107 may be wrapped under the animal's stomach and attached to a posterior-based costume 105 using a third fastener 202. It is further envisioned that the leash attachment apparatus 203 may be placed on the animal's shoulders, though the leash attachment apparatus 203 may be placed elsewhere on the three straps 101, 102, 107. Such a placement may allow a user to easily connect a leash to the animal without disrupting the costume or interrupting the soothing pressure created by the three straps three straps 101, 102, 107. An upper exterior surface of the leash attachment apparatus 204 may also be disposed to receiving a decorative piece 104. The decorative piece 104 may be removably attached to the upper exterior surface of the leash attachment apparatus 204 through the use of snaps, magnets, or Velcro®, though other attachment devices known in the art are also contemplated by the present invention.

In one embodiment of the present invention, the leash attachment apparatus 203 may be removably attached to the first strap 101 and the second strap 102 through the use of snaps, magnets, or Velcro®, though other attachment devices known in the art are also contemplated. This may allow a user to easily remove the leash attachment apparatus 203 to be used with other costumes.

Figure 3:
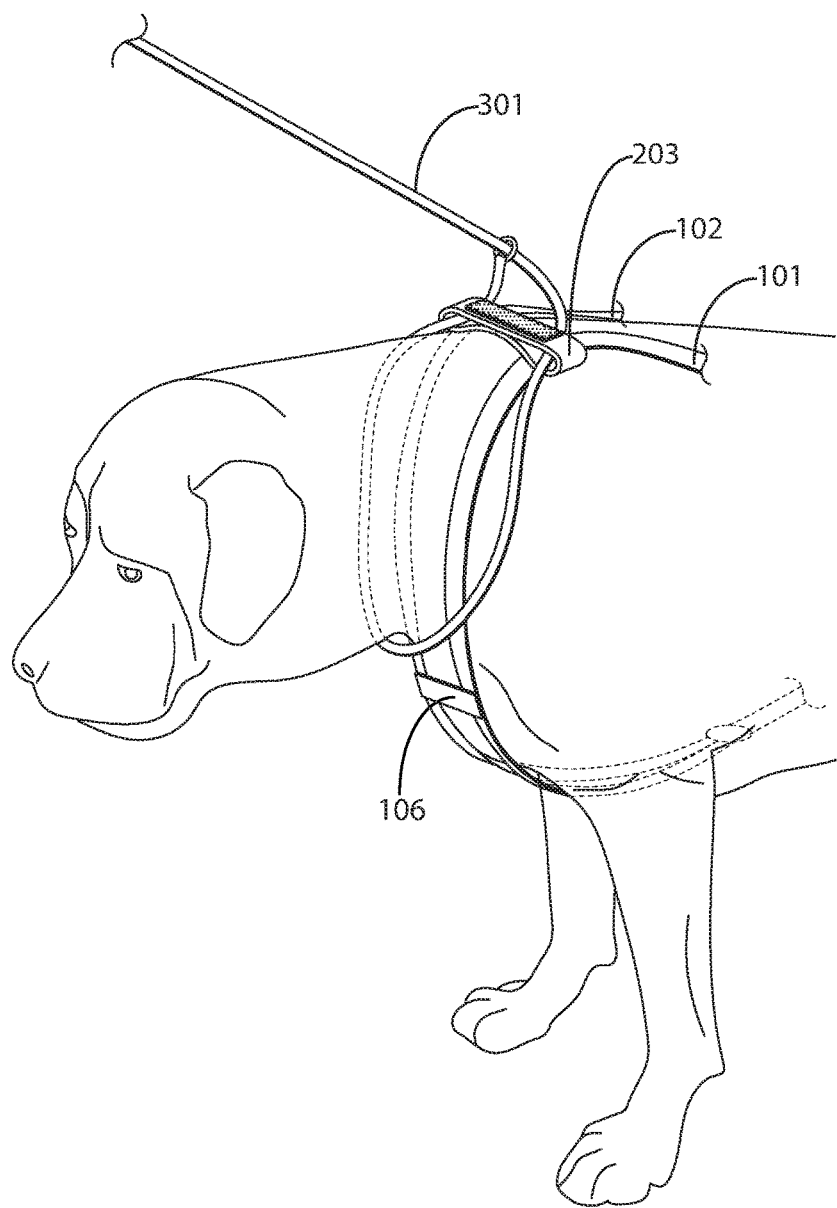
FIG. 3 illustrates a front perspective view of a leash and costume kit with a leash running through a leash attachment apparatus that is connected to a pair of straps in accordance with some exemplary embodiments of the present invention.

Turning now to the next figure, FIG. 3 illustrates a front perspective view of a leash and costume kit 100 with a leash 301 running through a leash attachment apparatus 203 that is connected to a first strap 101 and a second strap 102. In this exemplary embodiment, the leash attachment apparatus 203 may be attached to the first strap 101 and the second strap 102 at the shoulders of the animal. Though other locations for the leash attachment apparatus 203 are contemplated by the present invention, placing the leash attachment apparatus 203 at the animal's shoulders may allow for greater ease of installation and control over the animal. As demonstrated by the illustration, the leash 301 may be run through a first leash attachment loop 302 of the leash attachment apparatus 203, under the animal's neck, and out through a second leash attachment loop 303 of the leash attachment apparatus 203. Such an installation may allow a user to easily attach the leash 301 to the dog without interfering with the animal's costume or the soothing pressure provided by the straps 101, 102, 107.

In one embodiment, the leash attachment apparatus 203 may be connected to the first strap 101 and the second strap 102 via snap buttons. However, other attachment devices known in the art, such as magnets and Velcro®, are contemplated by the present invention.

Accordingly, in an exemplary embodiment of the present invention, animal leash and costume kit 100, may include: a pressure-applying harness, including a plurality of straps coupled to a costume; and a leash attachment apparatus removably coupled to the pressure-applying harness, formed by a plurality of leash attachment loops adapted to receive a portion of a leash.

Figure 4:
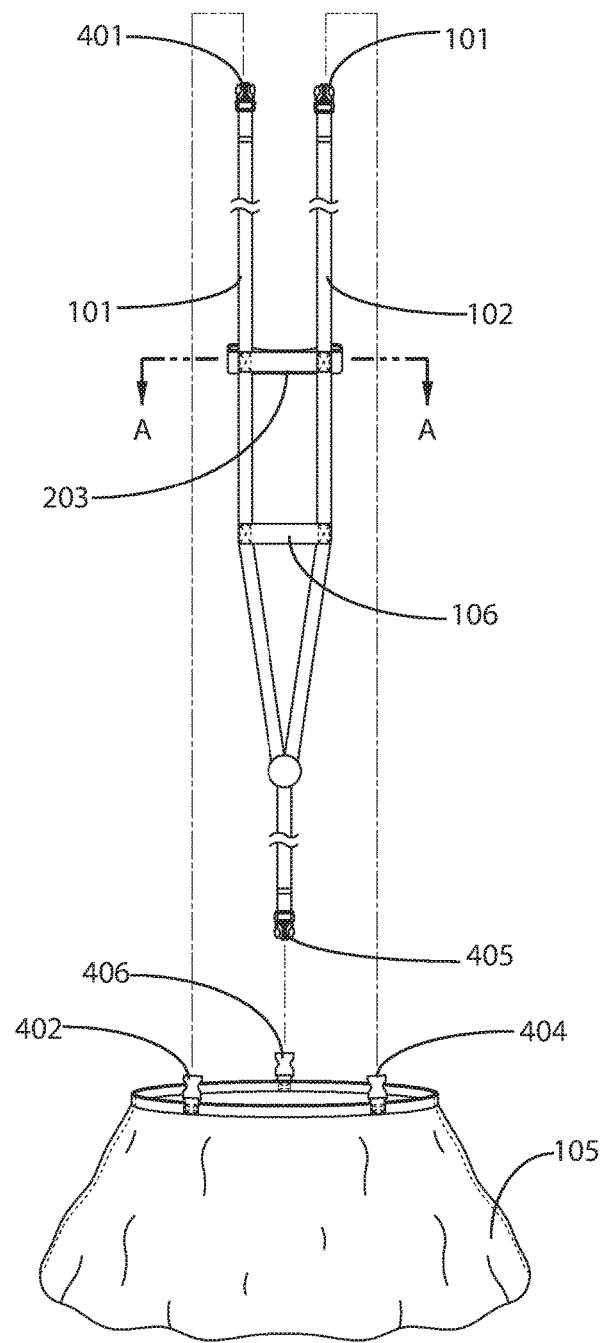
FIG. 4 illustrates a top exploded view of a pressure-applying harness comprising a plurality of straps including male fastener members disconnected from a plurality of female fastener members attached to a costume in accordance with some exemplary embodiments of the present invention.

Referring now to FIG. 4, a top exploded view of a pressure-applying harness 400 with a plurality of male fastener members disconnected from a plurality of female fastener members attached to a costume 105 is shown. This illustration shows an embodiment of the present invention whereby a first male fastener member 401, a second male fastener member 403, and a third male fastener member 405 are attached to a first female fastener member 402, a second female fastener member 404, and a third female fastener member 406, respectively. The male fastener members 401, 403, 405 may be attached to the straps 101, 102, 107, and the female fastener members 402, 404, 406 may be attached to the posterior-based costume 105. However, the female fasteners 402, 404, 406 may be attached to the straps 101, 102, 107, the male fastener members 401, 403, 405 may be attached to the posterior-based costume 105, or any combination thereof, without deviating from the scope of the present invention. FIG. 4 exemplifies how the straps 101, 102, 107 are attached to a poster-based costume 105 via the use of said fasteners. In one embodiment, the first and second 101-102 may connect to the posterior-based costume 105 by being placed over the animal's shoulders and connecting the first and second male fastener members 401 and 403 to the first and second female fastener members 402 and 404, respectively. The third male fastener member 405 may connect to the posterior-based costume 105 by being placed under the animal's stomach and connecting the third male fastener 405 to the third female fastener 406. Connecting the straps 101, 102, 107 to the posterior-based costume 105 in this manner may prevent the animal's costume from becoming misaligned while simultaneously providing soothing pressure to the animal.

Accordingly, in an exemplary embodiment of the present invention, pressure-applying harness 400, may include: a pair of straps joined at a first end and coupled together with one or more crosspieces, the pair of straps including a second and a third end opposite to the first end, wherein the pair of straps form a harness configured to wrap over the back and underneath of an animal's body; a first, second and third fasteners situated at each of the first, second and third ends; and a costume with corresponding first, second and third fasteners configure to register with the first, second and third fasteners situated at each of the first, second and third ends.

Figure 5:
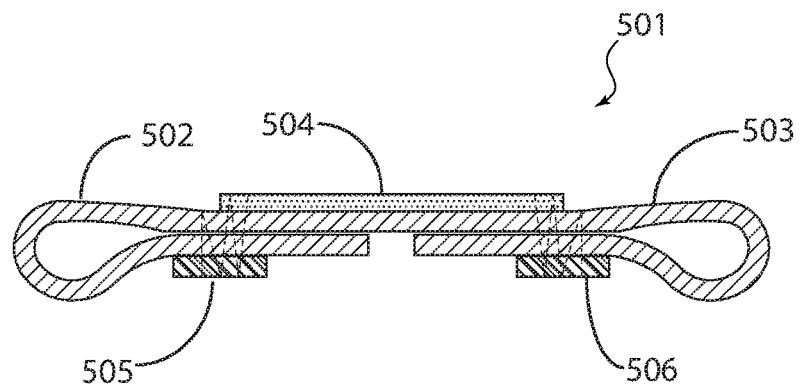
FIG. 5 illustrates a front orthogonal view of a leash attachment apparatus with a first and second removable loop connector in accordance with some exemplary embodiments of the present invention.
Figure 6:
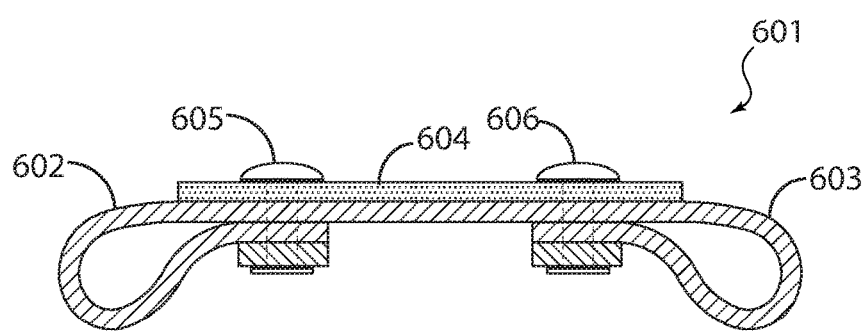
FIG. 6 illustrates a front orthogonal view of a leash attachment apparatus with a first and second removable loop connector in accordance with some exemplary embodiments of the present invention.
Figure 7:
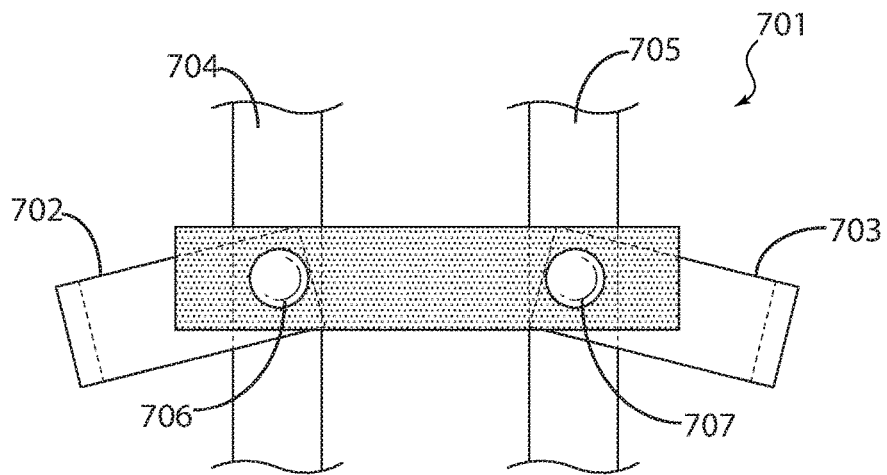
FIG. 7 illustrates a top view of a leash attachment apparatus with a first and second removable loop connector attached to a pair of straps of a pressure-applying harness in accordance with some exemplary embodiments of the present invention.
Figure 8:
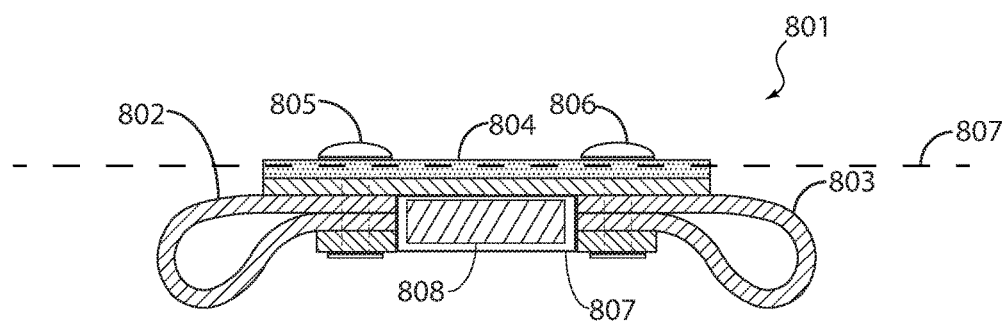
FIG. 8 illustrates a front orthogonal view of a leash attachment apparatus with a first and second removable loop connector in accordance with some exemplary embodiments of the present invention.

Turning now to the next set of figures, FIG. 5 illustrates a front orthogonal view of a leash attachment apparatus with a first and second removable loop connector in accordance with some exemplary embodiments of the present invention; FIG. 6 illustrates a front orthogonal view of a leash attachment apparatus with a first and second removable loop connector in accordance with some exemplary embodiments of the present invention; FIG. 7 illustrates a top view of a leash attachment apparatus with a first and second removable loop connector attached to a pair of straps of a pressure-applying harness in accordance with some exemplary embodiments of the present invention; and FIG. 8 illustrates a front orthogonal view of a leash attachment apparatus with a first and second removable loop connector in accordance with some exemplary embodiments of the present invention.

FIGS. 5 and 6 illustrate a front orthogonal view of a leash attachment apparatus 501 and 601 with a first removable loop connector 502 and 602 and a second removable loop connector 503 and 603; FIG. 8 illustrates a front orthogonal view of a leash attachment apparatus 801 with a first removable least attachment loop 802 and a second removable leash attachment loop 803. In one embodiment of the present invention, the leash attachment apparatus 801 is formed by a plurality of leash attachment loops through which a leash may run. By way of example and not limitation, the leash attachment apparatus 801 may have a first removable leash attachment loop 802 and a second removable leash attachment loop 803 separated from each other along a horizontal axis 807 of the leash attachment apparatus 801 by a distance. The leash attachment apparatus 801 may also have a decoration attachment apparatus 804 on an exterior upper surface of the leash attachment apparatus 801. The decoration attachment apparatus 804 may allow a decorative piece to be attached to the leash attachment apparatus 801, thus concealing the leash attachment apparatus 801 from view.

In an embodiment of the present invention, the leash attachment apparatus 801 may be made from either a relatively rigid material or an elastic material. For example, and without limitation, the leash attachment apparatus 801 may be made out of leather or nylon. Of course, other materials known in the art are contemplated by the present invention.

In another embodiment of the present invention, the first removable leash attachment loop 802 and the second removable leash attachment loop 803 of the leash attachment apparatus 801 may be made by applying a first removable loop connector 805 and a second removable loop connector 806 to the leash attachment apparatus 801. By having the first and second removable loop connectors 805, 806 be removable, the leash attachment apparatus 801 may be easily removed and attached to various costumes and/or a pressure-applying harness in accordance with the present invention. By way of example and in no way limiting the present invention, the first removable leash attachment loop 802 and the second removable leash attachment loop 803 may be formed by using first removable loop connector 805 and a second removable loop connector 806, comprised of snap buttons, magnets, and/or Velcro®, to attach the ends of the leash attachment apparatus 808 to a main body of the leash attachment apparatus 809, which may form a loop. Of course, other attachment means known in the art are contemplated by the present invention. In some exemplary embodiments as shown, leach attachment apparatus 801 includes a pocket or cavity 807 in which a magnetic component may e coupled thereto in order to attach the apparatus 801 to a harness and or costume.

FIG. 7 illustrates a top view of a leash attachment apparatus 701 with a first removable leash attachment loop 702 and a second removable leash attachment loop 703 attached to a first strap 704 and a second strap 705 of a pressure-applying harness in accordance with the present invention, such as harness 400. As seen in this embodiment of the present invention, the leash attachment apparatus 701 is connected to the first strap 704 and a second strap 705. The first removable leash attachment loop 702 and the second removable leash attachment loop 703 attached to the leash attachment apparatus 701 may extend away from the first and second straps 704, 705 so as to prevent a leash from interfering with the first and second straps 704, 705.

Figure 9:
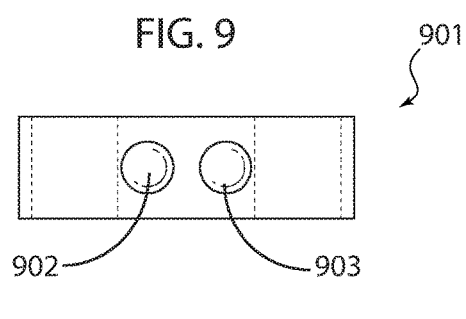
FIG. 9 illustrates a top view of a leash attachment apparatus in accordance with some exemplary embodiments of the present invention.
Figure 10A:
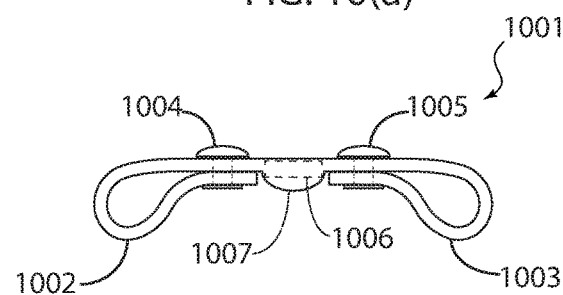
FIG. 10(a)-FIG. 10(b) illustrates a front orthogonal view of a leash attachment apparatus with a first and second removable loop connector without a decoration attachment apparatus in accordance with some exemplary embodiments of the present invention.
Figure 10B:
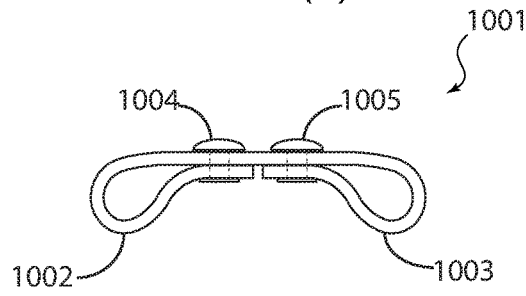

FIG. 9 illustrates a top view of a leash attachment apparatus 901, and FIG. 10(a)-FIG. 10(b) illustrate a front orthogonal view of a leash attachment apparatus 1001 with a first removable leash attachment loop 1002 and a second removable leash attachment loop 1003. The leash attachment apparatus 1001 may also have a first removable loop connector 1004 and second removable loop connector 1005 without a decoration attachment apparatus. In some embodiments of the present invention, the leash attachment apparatus 1001 may not be equipped to receive a decorative piece. In the embodiment of FIG. 10(a), note that an extra space 1007 or length between loops 1002 and 1003 facilitate the placement of a coupling component 1006, such as a fastener or other attachment means, in order to attach the leash attachment apparatus to, for example, a costume, harness or outfit. The coupling component 1006 may be a magnet, Velcro, a button or any other attachment means without deviating from the scope of the present invention.

Figure 11:
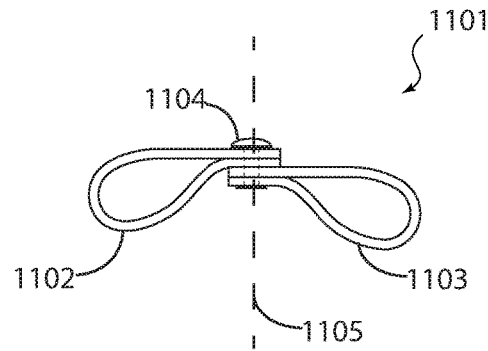
FIG. 11 illustrates a front orthogonal view of a leash attachment apparatus with a first removable loop connector without a decoration attachment apparatus in accordance with some exemplary embodiments of the present invention.

FIG. 11 illustrates a front orthogonal view of a leash attachment apparatus 1104 with a first removable loop connector 1104 without a decoration attachment apparatus. In an embodiment of the present invention, the leash attachment apparatus 1101 may only have one removable loop connector 1104. Rather than the leash attachment apparatus 1101 having a first removable leash attachment loop 1102 and a second removable leash attachment loop 1103 created using a first and second removable loop connector, a single removable loop connector 1104 may be used. In such an embodiment, the single removable loop connector 1104 may be located along a central vertical axis 1105 of the leash attachment apparatus 1101. If the single removable loop connector 1104 is a magnet, as is envisioned in some embodiments of the present invention, the magnet may be used to connect all ends of the leash attachment apparatus 1101 in a single, vertical line that may be located along the central vertical axis 1105 of the leash attachment apparatus 1101.

Accordingly, an animal leash attachment, in accordance with some exemplary embodiments of the present invention, may include: a horizontal support strap; a first removable attachment loop coupled to the horizontal support strap at a first terminal end; and a second removable attachment loop coupled to the horizontal support strap at a second terminal end, wherein the first and second removable attachment loops are each adapted to receive a portion of a leash.

Moreover, in some exemplary embodiments, an animal leash attachment may include: a horizontal support strap; a first removable leash attachment loop coupled to the horizontal support strap at a first terminal end; and a second removable leash attachment loop coupled to the horizontal support strap at a first terminal end, wherein the first and second removable leash attachment loops are adapted to receive a portion of a leash.

In an embodiment of the invention, the harness may have a first and second strap that wrap over an animal's back to attach to a posterior-based costume via fasteners. A third fastener may be located on an anterior side of the animal to attach a third strap to the posterior-based costume. Utilizing the suspender straps in this manner may allow the costume to stay in place while simultaneously providing soothing pressure to the animal.

Figure 12:
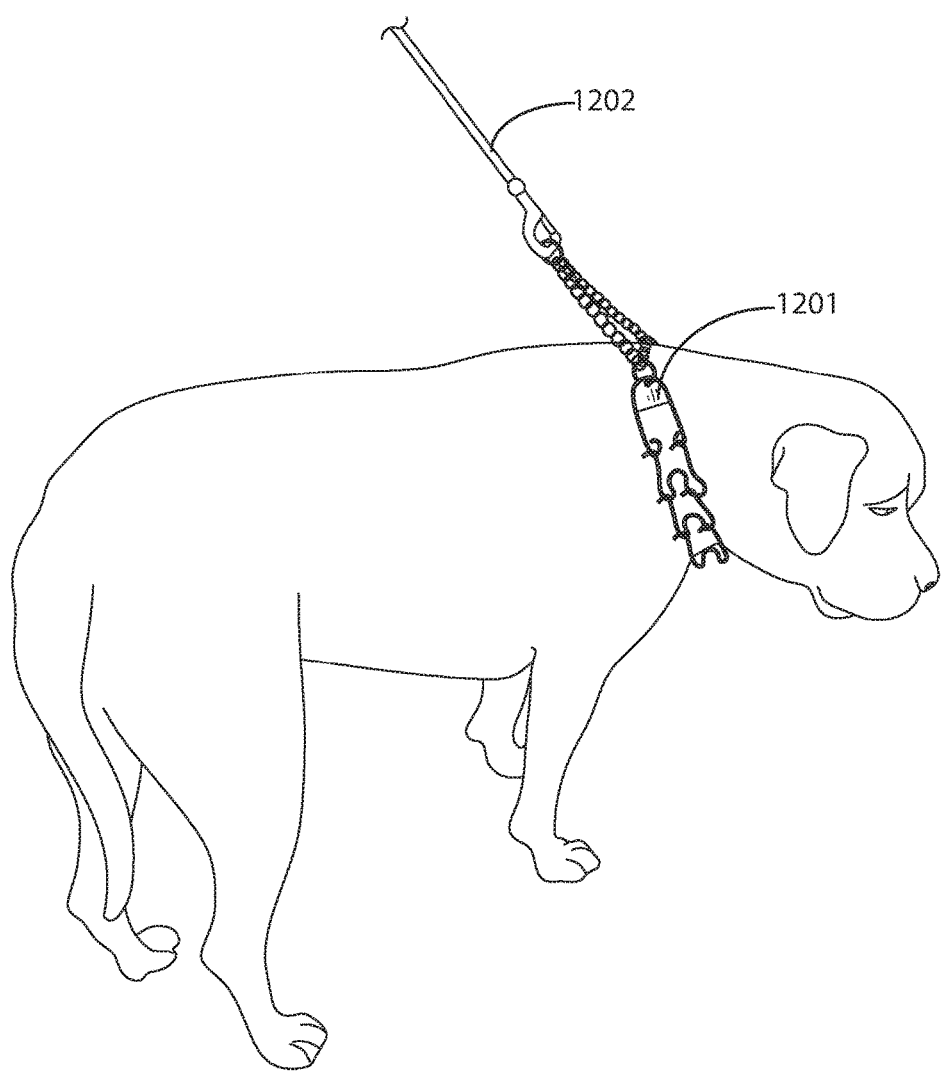
FIG. 12 illustrates a perspective view of a dog wearing a choke collar with an attached leash in accordance with known devices that do not conceal the choke collar.
Figure 13:
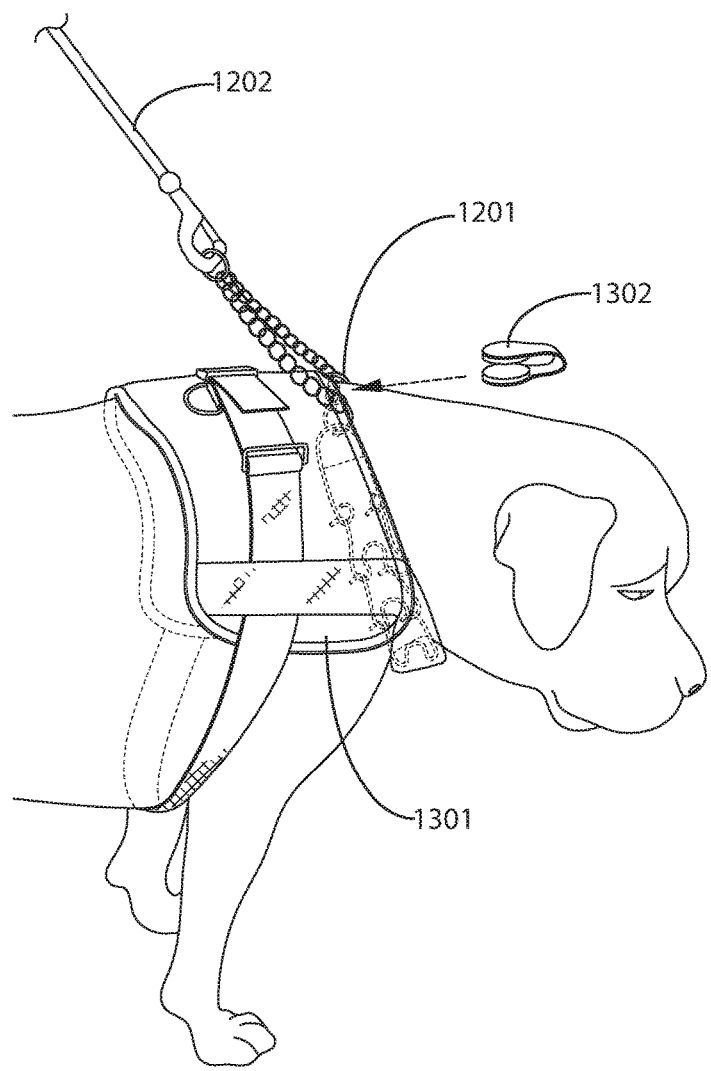
FIG. 13 illustrates a perspective view of a choke collar with an attached leash and an unattached collar fastener in accordance with some exemplary embodiments of the present invention.
Figure 14:
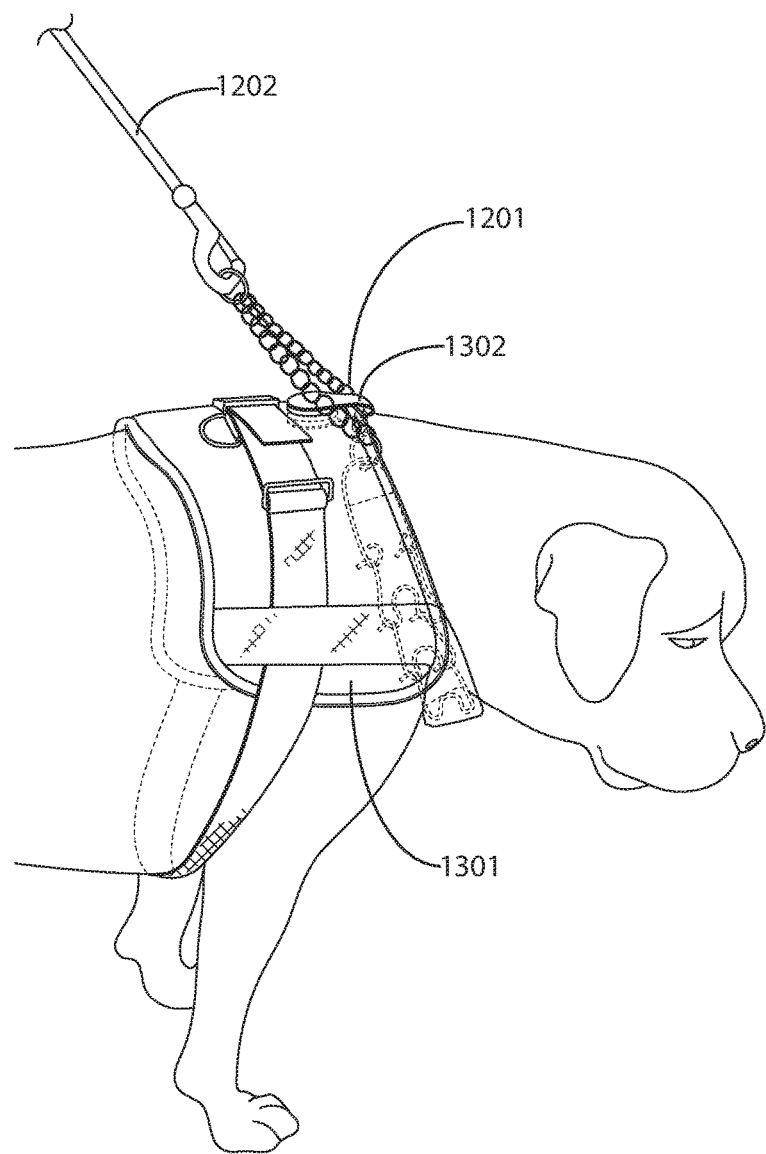
FIG. 14 illustrates a perspective view of a choke collar with an attached leash and an attached collar fastener in accordance with some exemplary embodiments of the present invention.

FIG. 12 illustrates a perspective view of a dog wearing a collar 1201 with an attached leash 1202, FIG. 13 illustrates a perspective view of a collar 1201 with an attached leash 1202 and an unattached collar fastener 1302, and FIG. 14 illustrates a perspective view of a collar 1201 with an attached leash 1202, a collar concealer 1301, and an attached collar fastener 1302. In some embodiments of the present invention, an animal owner may use a choke collar 1201 on their animal to aid in training the animal and maintaining control over the animal while using a leash 1202. However, some members of the public became anxious and fearful upon seeing an animal wearing a choke collar 1201; although unharmful with experienced trainers, the visually aggressive training collars have been noted to cause concern in public social settings. Similarly, K-9, therapy, supportive training collars can affect perception of the in-training dog as an aggressive, unruly or dangerous animal. This interaction or social behavior can negatively affect the training of the animal to effectively perform its intended duty. That is, the anxiety and fear expressed by the viewing public may have the effect of creating or augmenting the anxiety and fear of the animal.

To prevent this creation and exacerbation of anxiety and fear, some embodiments of the invention envision placing a collar concealer 1301 over an animal's collar 1201 and securing the collar concealer 1301 over the collar 1201 by using a collar fastener 1302. The collar fastener 1302 may prevent the collar concealer 1301 from slipping off of the collar 1201. The collar fastener 1302 may be a magnet between which the animal's collar 1201 and the collar concealer 1301 are inserted. However, other collar fasteners 1302 known in the art, such as but without limitation, a clip, may be used to secure the animal's collar 1201 to the collar concealer 1301 without departing from the spirit of the invention.

In another embodiment of the present invention, the collar concealer 1301 may also serve the function of supplying soothing pressure to the animal, thus aiming to reduce the animal's fear and anxiety further.

Figure 15:
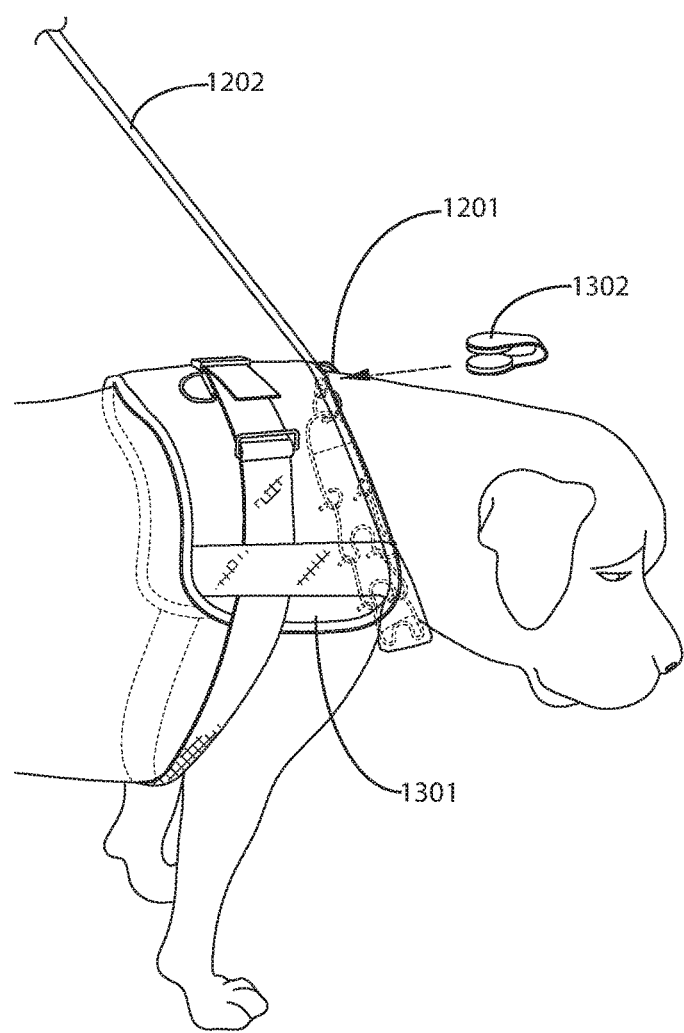
FIG. 15 illustrates another exemplary embodiment in which a single fixed attachment facilitates the implementation of a leash that is coupled to a small fixed collar piece of an unfixed.

Turning now to the next figure, FIG. 15 shows another exemplary embodiment in which a single fixed attachment facilitates the implementation of a leash that is coupled to a small fixed collar piece of an unfixed, moveable collar (including chain, prongs, etc.) around the neck portion of the dog. The purpose of collar fastener 1302 may be two-fold: (1) to disguise what may be an otherwise intimidating chock collar from the public, which as mentioned above only aids in increasing the animal's anxiety, and (2) also as an attachment means for securing a portion of a costume that may be worn by the animal. To these same ends, several of the following embodiments disclosed with reference to FIGS. 16(a)-22(e) are similarly useful.

Figure 16A:
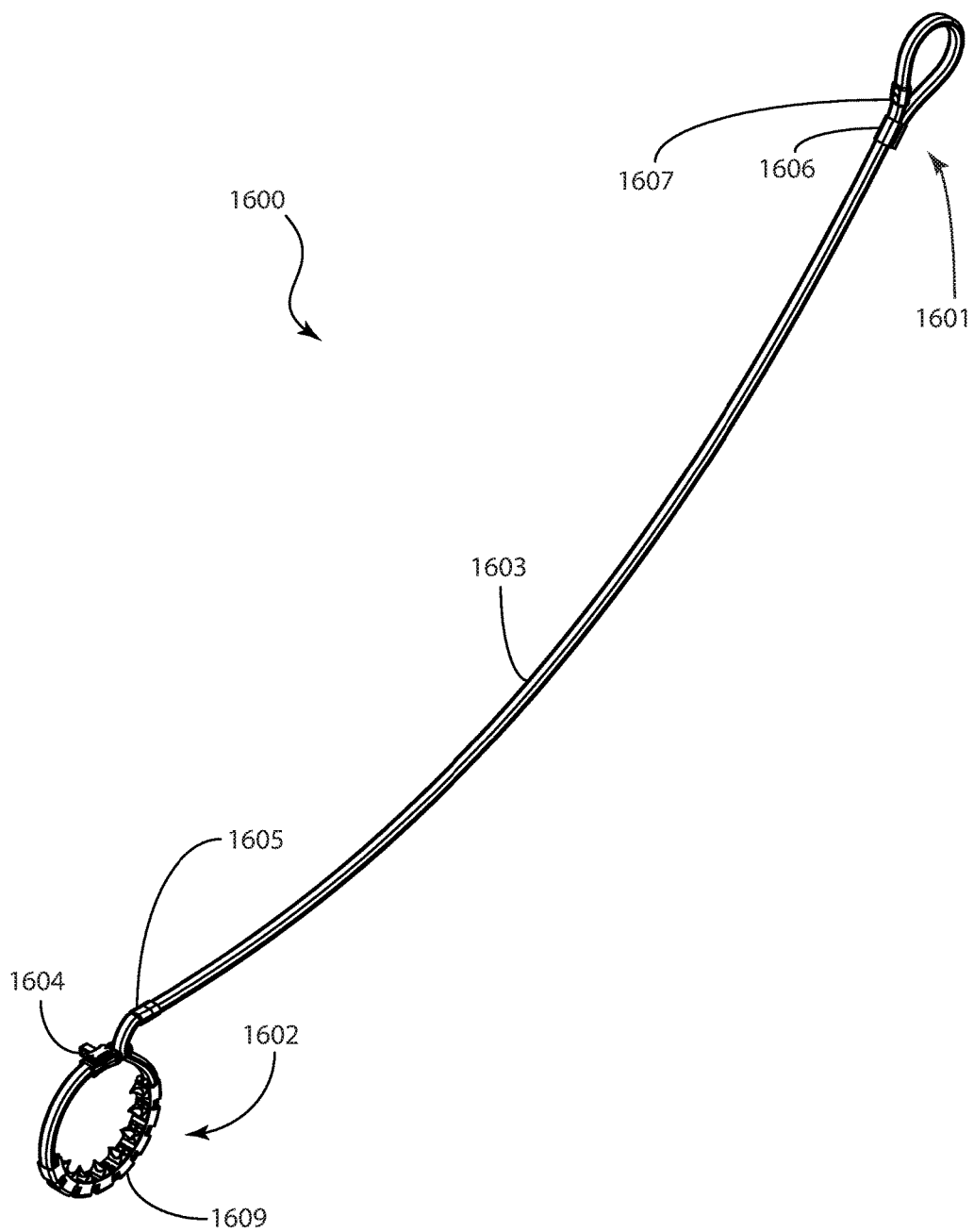
FIG. 16(a) illustrates a leash system in accordance with an exemplary embodiment of the present invention.

Turning to the next set of figures, FIG. 16(a) illustrates a leash system in accordance with an exemplary embodiment of the present invention. More specifically, these figures depict leash system 1600, comprising a handle 1601, a collar 1602, a leash 1603, a slip collar unit end cap or leash attachment apparatus 1604, a collar to leash connector (connector 1605), a leash to handle connector (connector 1606), and a leash LED control unit 1607. Leash system 1600 may be utilized with one or more embodiments of the present invention in which a leash attachment means such as leash attachment apparatus 1604 may be implemented with one or more costumes and leash 1603 may employ a removable set of prongs around the collar portion or collar 1602 of leash system 1600.

Figure 19A:
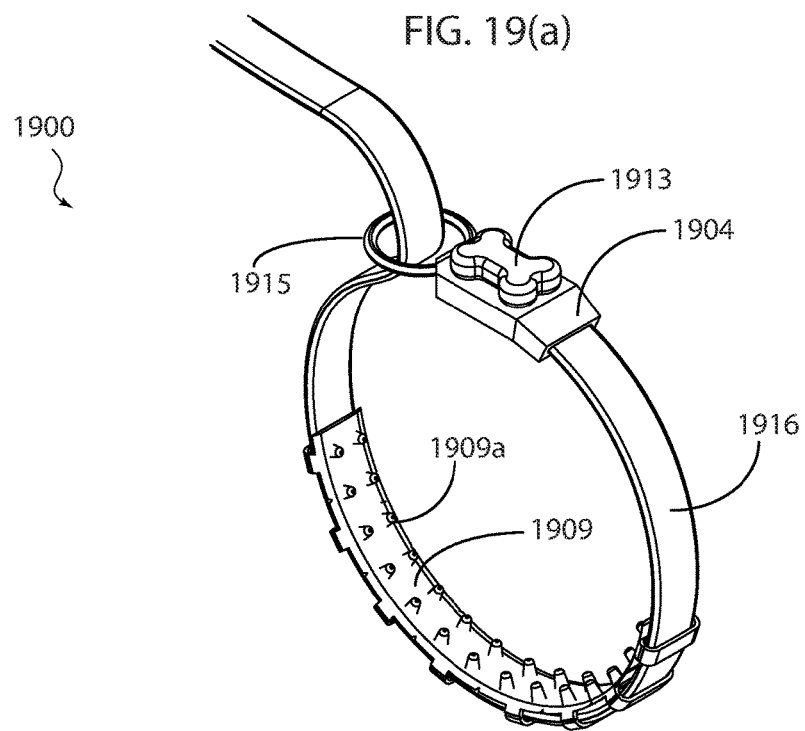
FIG. 19(a)-FIG. 19(b) illustrate a leash attachment apparatus coupled to a portion of a leash to form a collar for a leash system in accordance with one exemplary embodiment of the present invention.

Handle 1601, collar 1602, and leash 1603 may be constructed of a wide variety of materials without deviating from the scope of the present invention. For example, and without limiting the scope of the present invention, these parts made and their various components may comprise plastics, leather, strap material or any combination thereof. In an exemplary embodiment, however, handle 1601, collar 1602, and leash 1603 comprise of one or more substantially tubular elongated components (e.g. as shown in FIG. 16(a)) constructed of silicone with an imbedded LED strip 1610 for lighting. In some exemplary embodiments, handle 1601, collar 1602, and leash 1603 comprise of one or more substantially flat tubular elongated components (e.g. as shown in FIG. 19(a)) constructed of silicone with an imbedded LED strip 1610 for lighting. In yet other exemplary embodiments, handle 1601, collar 1602, and leash 1603 comprise of one or more elongated components without an imbedded LED strip 1610.

Turning to the next set of figures, FIG. 16(b)-FIG. 16(d) illustrate a handle of a leash system in accordance with an exemplary embodiment of the present invention. Handle 1601 comprises a first length or handle component 1608 that loops to form an opening or aperture 1608a within the loop, handle component 1608 coupled at a first and second terminal end to connector 1606, which includes to connection means for receiving each of the terminal ends of handle component 1608 therein. In embodiments in which leash system 1600 includes an LED strip 1610 imbedded within the one or more of the several leash components, leash connector 1606 may include a means for electrically connecting the LED strip 1610 in each component so that controller 1607 may control the turning on or off of the LEDs within the LED strip 1610. In exemplary embodiments, connector 1606 has at least three openings, two vertically oriented (one above the other as shown) on a first side of connector 1606, and at least one on the opposite side of connector 1606, so that a first terminal end of handle component 1608 may be connected to leash 1603 via a first port and a second port, and a second terminal end of handle component 1608 may be connected to connector 1607 via a third port. In this way, controller 1607 may be utilized to trigger one or more functions such as turning on or off the LED strip 1610, change colors, etc. depending on the functionalities and complexity of controller 1607 and or the LED strip 1610 imbedded within collar 1602, leash 1603, and handle 1601.

Controller 1607 may be any suitable controller without deviating form the scope of the present invention. That is, controller 1607 may include one or more buttons 1611 depending on the functions and complexity of the LED strip 1610. In exemplary embodiment, controller 1607 may include simple circuitry to turn on, turn off, and change a color scheme and lighting scheme of the LED strip 1610 imbedded within the leash system 1600. The light emitted from the LED strip 1610 may be desirable as a fun decorative piece, but also as a safety feature that may be turned on during jogging or walking that may occur during low light conditions.

Figure 16E:
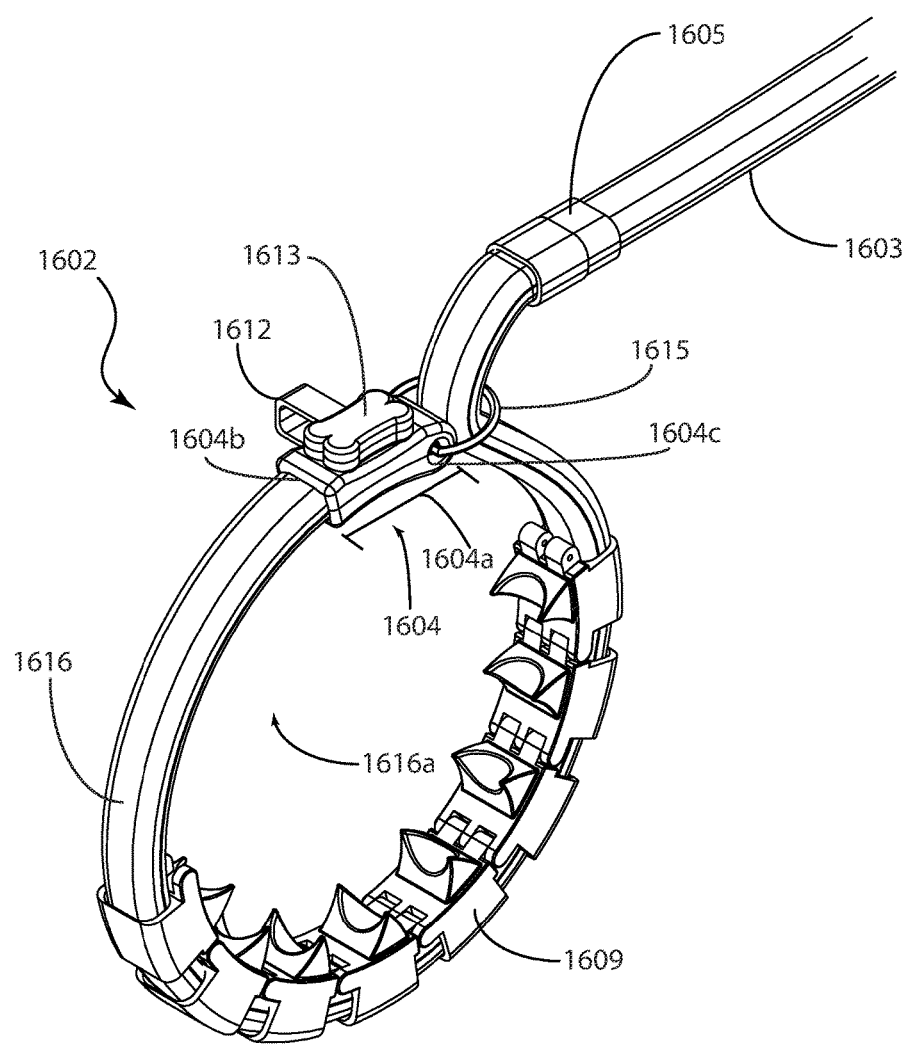
FIG. 16(e)-FIG. 16(i) illustrate a leash attachment apparatus coupled to a portion of a leash to form a collar for a leash system in accordance with one exemplary embodiment of the present invention.
Figure 16F:
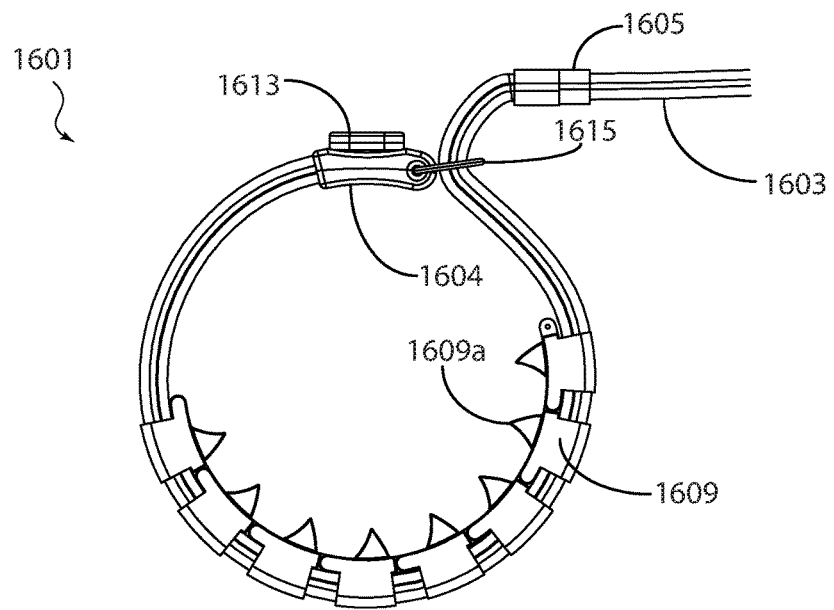
Figure 16G:
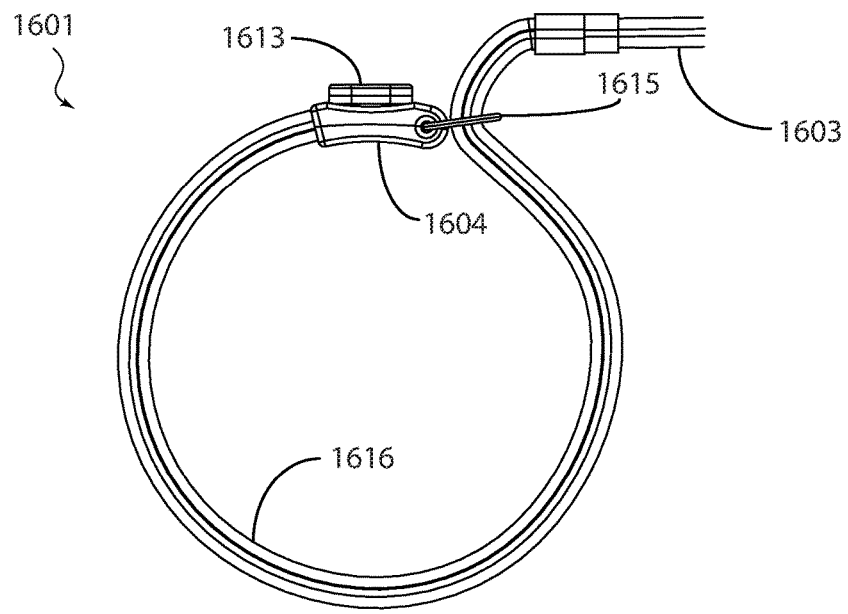
Figure 16H:
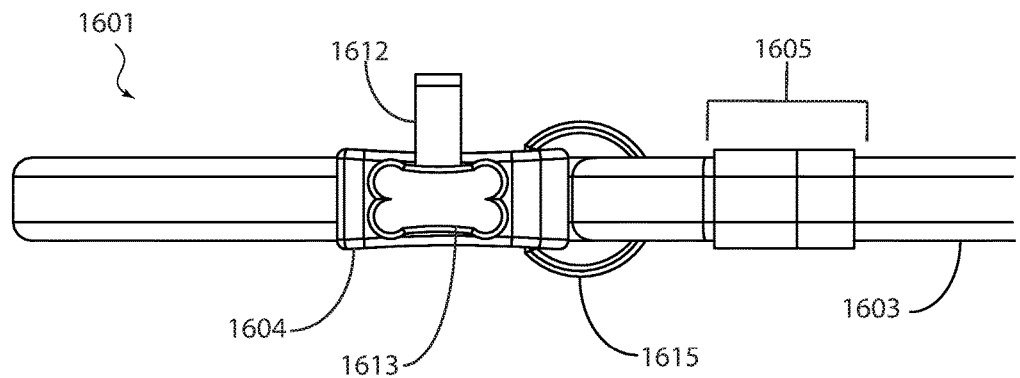
Figure 16I:
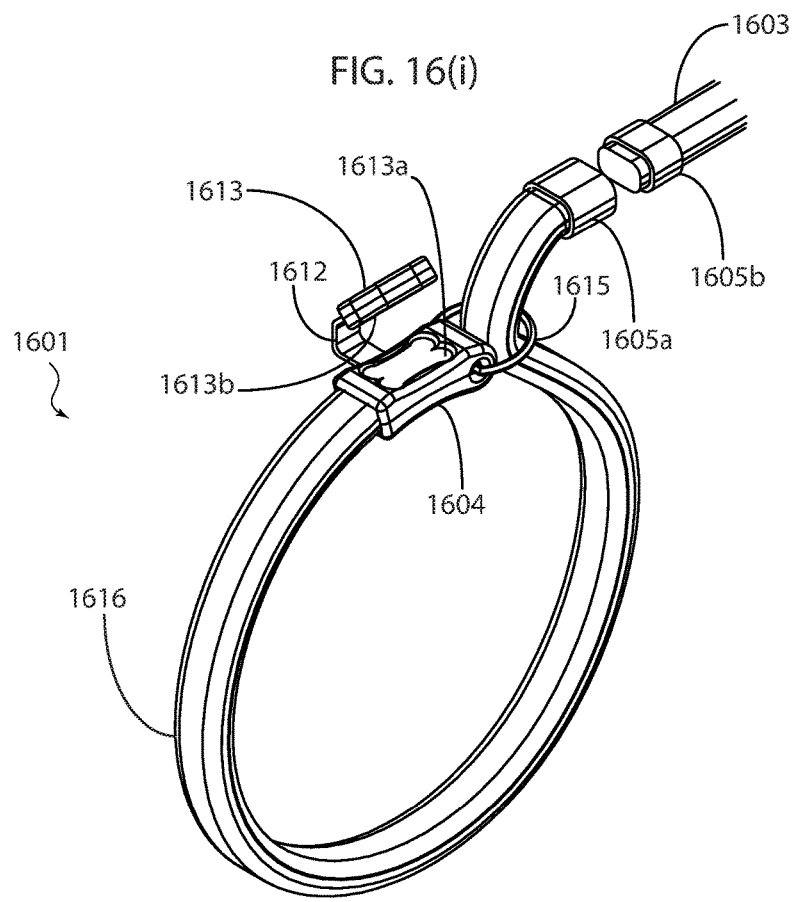
Figure 17A:
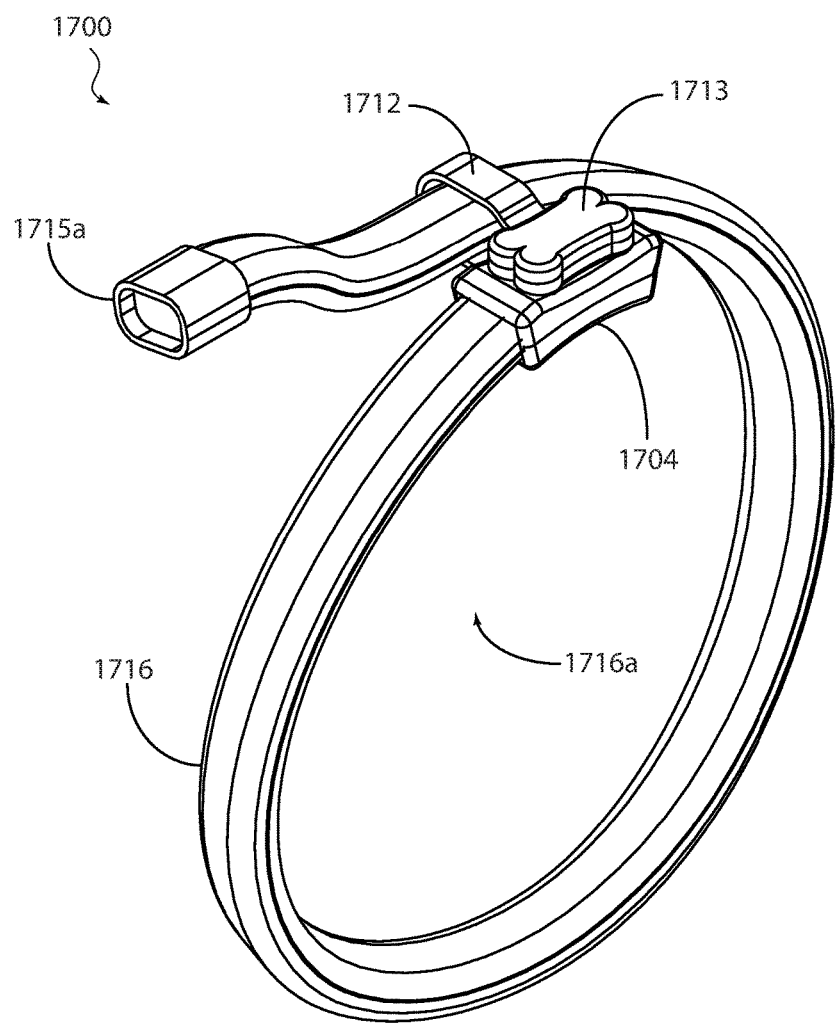
FIG. 17(a)-FIG. 17(g) illustrate a leash attachment apparatus coupled to a portion of a leash to form a collar for a leash system in accordance with one exemplary embodiment of the present invention.
Figure 17B:
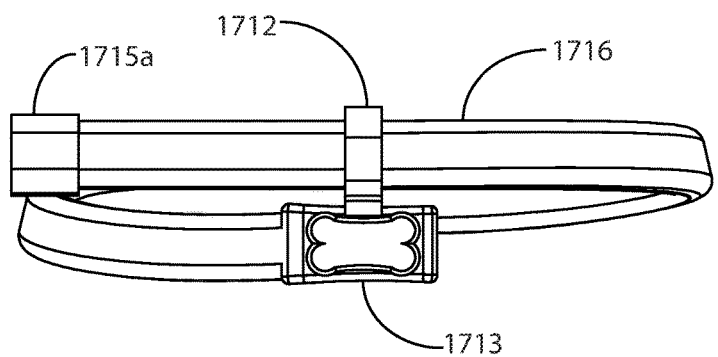
Figures 17C, 17D:
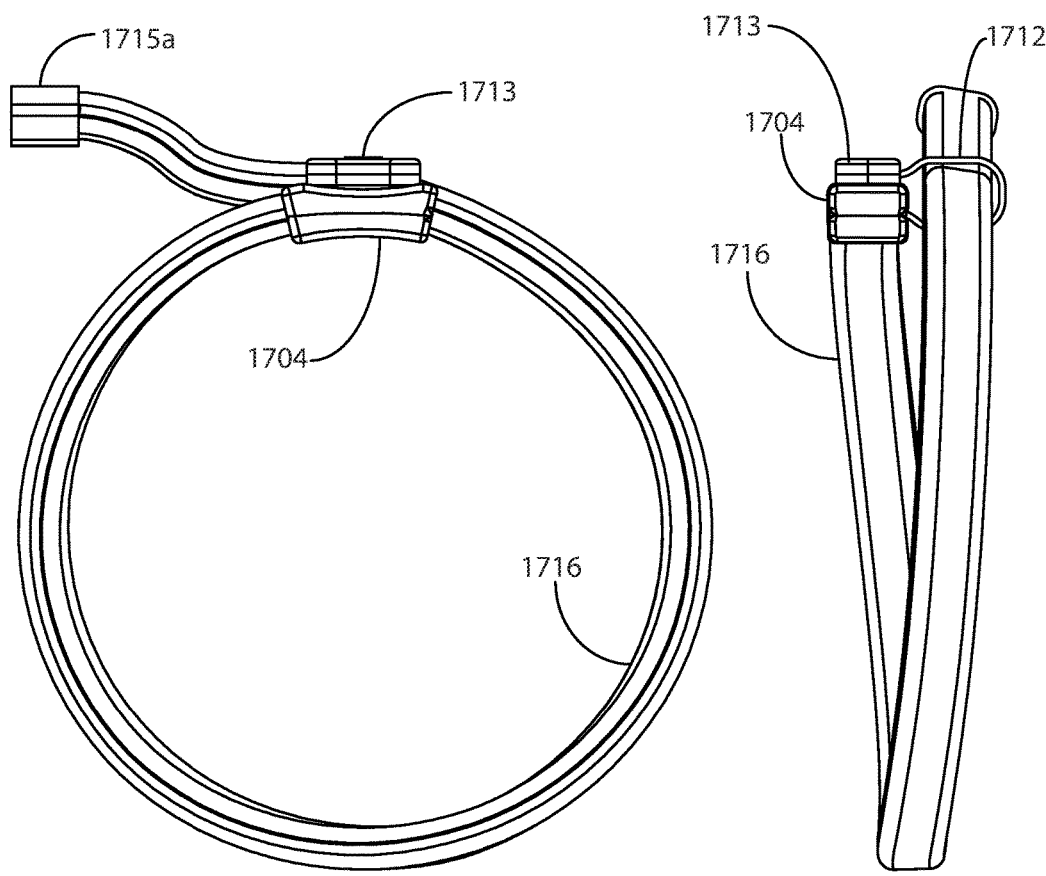
Figure 17E:
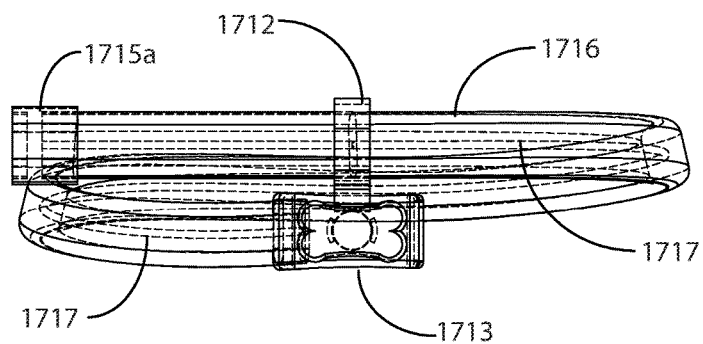
Figure 17F:
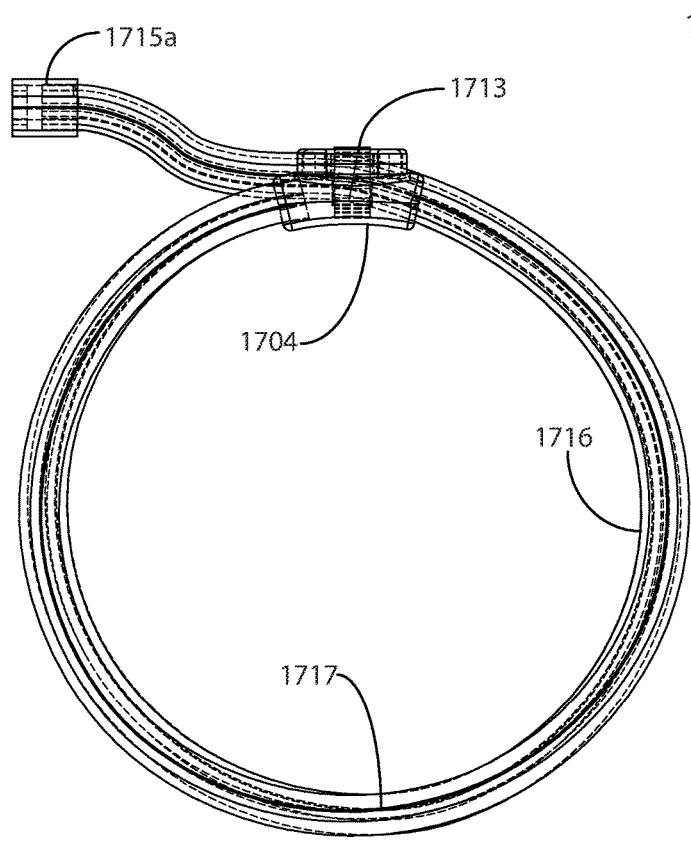
Figure 17G:
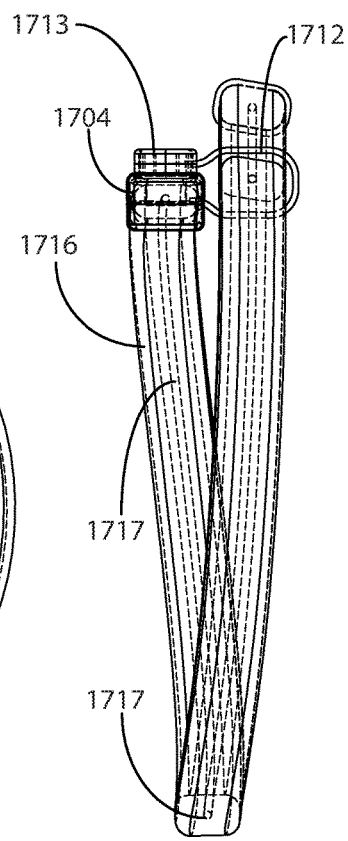
Figure 18A:
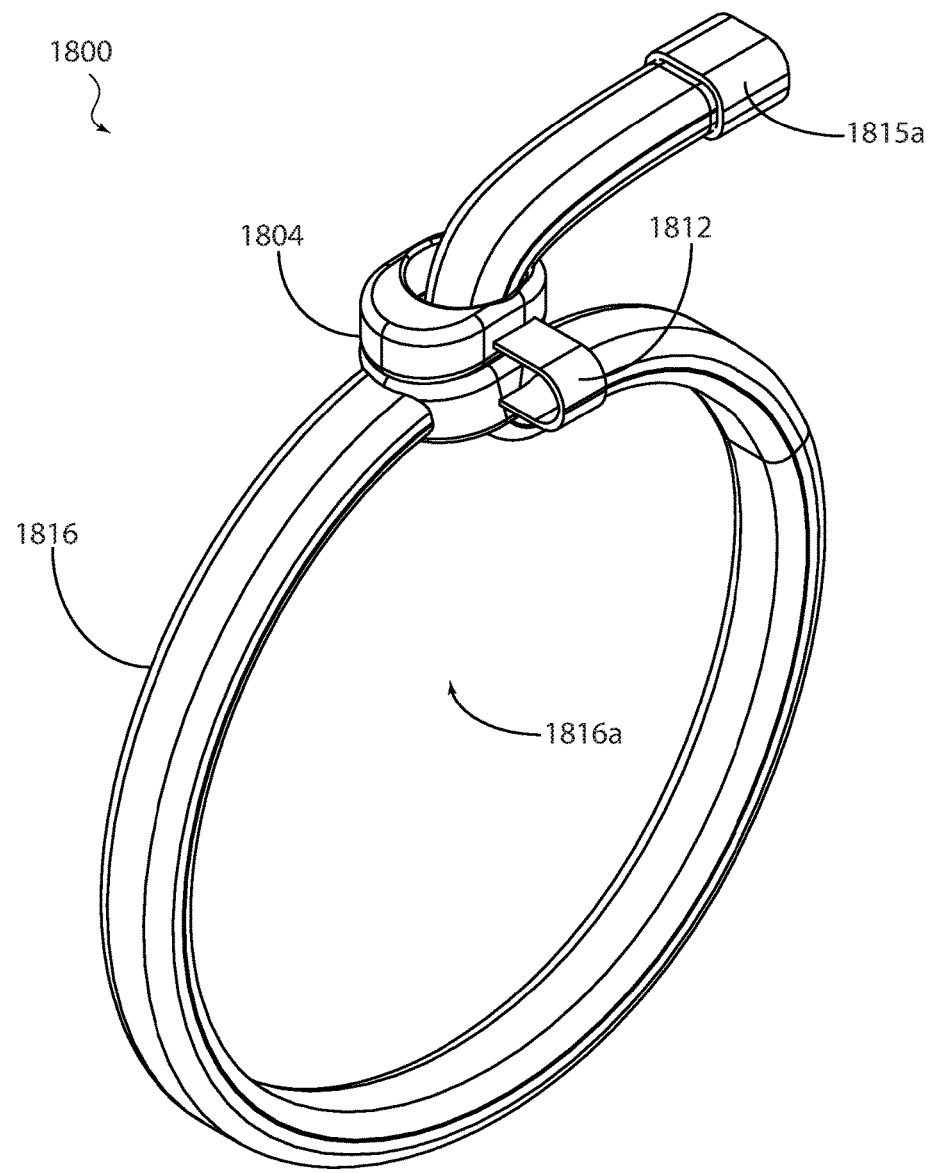
FIG. 18(a)-FIG. 18(g) illustrate a leash attachment apparatus coupled to a portion of a leash to form a collar for a leash system in accordance with one exemplary embodiment of the present invention.
Figure 18B:
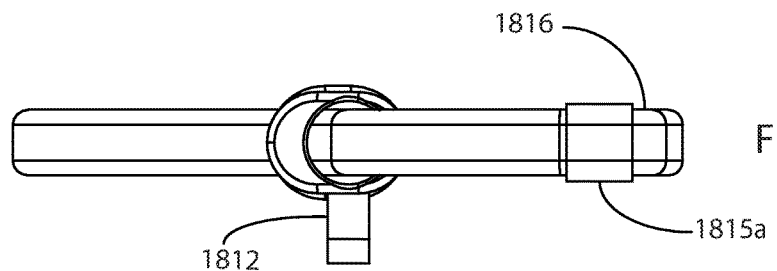
Figure 18C:
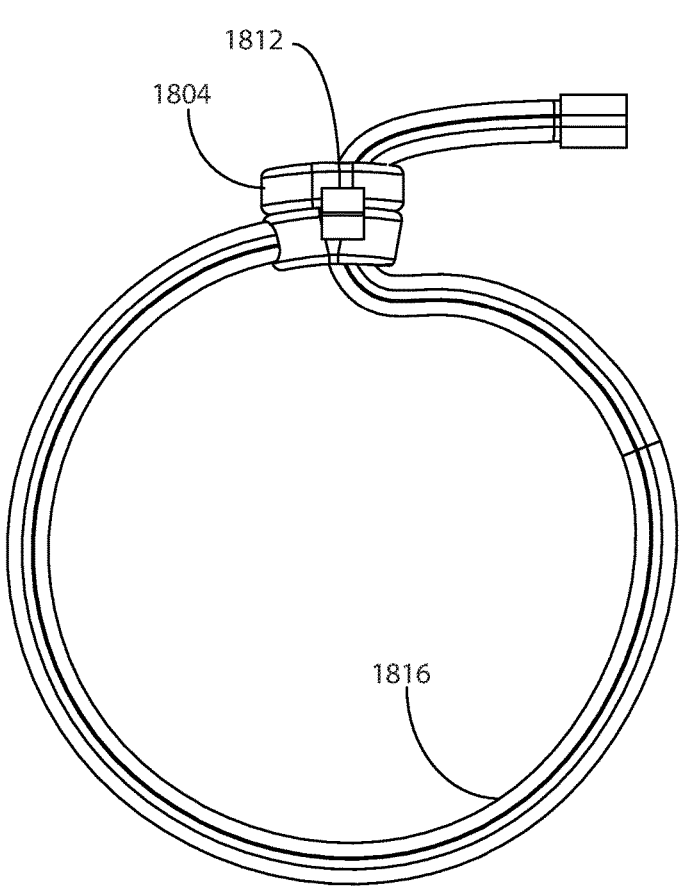
Figure 18D:
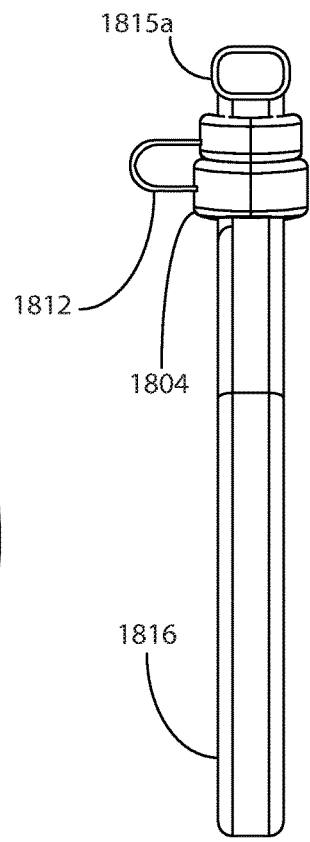
Figure 18E:
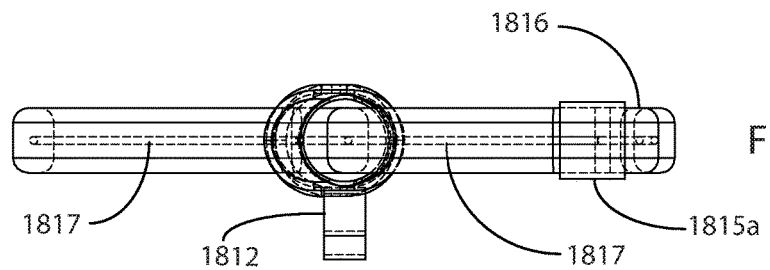
Figures 18F, 18G:
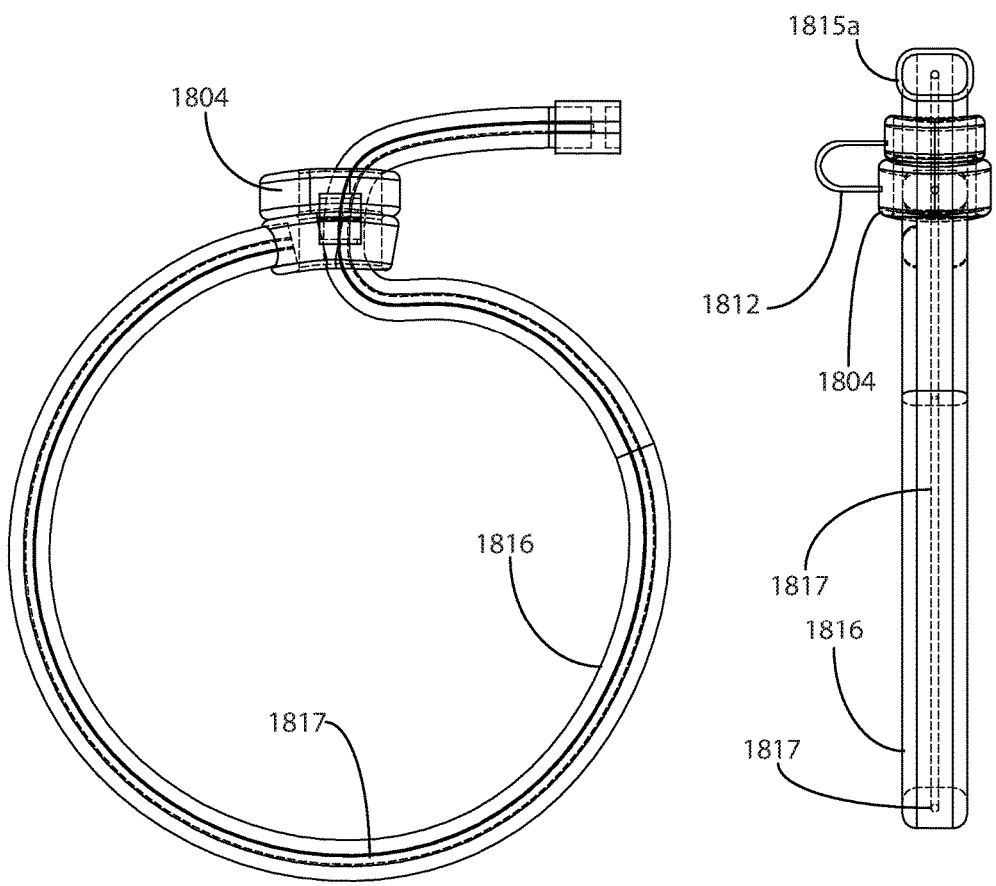

Turning now to the next set of figures, FIG. 16(e)-FIG. 16(i) illustrate a leash attachment apparatus coupled to a portion of a leash to form a collar for a leash system in accordance with one exemplary embodiment of the present invention More specifically, the following set of figures focus on the collar 1602 portion of leash system 1600, wherein collar 1602 comprises a collar component 1616, which connects to leash 1603 via a leash connector 1605, looping around to form an aperture 1616a and threaded through ring 1615 of leash attachment apparatus 1604. In some embodiments, a set of prongs 1609 may be coupled on to collar component 1616 for training an animal. As will be discussed in more detail below, other embodiments of prongs for use with a collar in accordance with the present invention may be implemented as well. FIG. 16(e) illustrates a perspective view of collar 1062; FIG. 16(f) illustrates a front view of collar 1062, including a plurality of prongs 1609 (that serve as a so-called choke collar); FIG. 16(*g*) illustrates a front view of collar 1062, without the plurality of prongs 1609; FIG. 16(*h*) illustrates a top view of collar 1062, and particularly a top view of leash attachment apparatus 1604; and FIG. 16(*i*) illustrates a perspective view of collar 1062, and particularly a view in which leash attachment apparatus 1604 is in an opened configuration.

Collar component 1616 is typically constructed of a similar material and in a similar configuration as leash 1603. For example, and without limiting the scope of the present invention, collar component 1616 comprises a substantially tubular elongated components constructed of silicone with an imbedded LED strip that may be connected to LED strip 1610 as shown with reference to handle 1601 for lighting. In yet other exemplary embodiments, collar component 1616 excludes such LED strip, for example if such embodiment does not require or include lighting.

Leash connector 1605 connects collar component 1616 to leash 1603 two connector ports suitable for electrically connecting any LED strip that may be imbedded within Collar component 1616 and leash 1603. In addition to providing electrical connectivity between collar component 1616 and leash 1603, connector 1605 needs to be strong enough to handle an animal such as a dog from breaking away. As such, connector 1605 should include a connection means such as a strong magnet and or coupling means of securing each component together such as fasteners, clasps, etc.

As may be appreciated from FIG. 16(*e*)-FIG. 16(*g*), collar component 1616 loops around itself in a manner such that aperture 1616*a* is formed in order to be placed around a collar of an animal or pet. As will be discussed in turn, on a first terminal end of collar component 1616, a connector means for registering with connector 1605 is disposed. On the other terminal end of collar component 1616, the collar component may be, at a first terminal end of the cable component 1616, securely coupled to an end cap or leash attachment apparatus 1604 in accordance with the present invention.

Leash attachment apparatus 1604 comprises a substantially hollow body 1604*a* including an opening 1604*b* at one end of the body for receiving a terminal end of collar component 1616. In some exemplary embodiments, such as the one shown in FIG. 16(*e*), leash attachment apparatus 1604 includes a ring 1615 at an opposite end of the opening, the ring configured to receive a second terminal end and portion of collar component 1616 therethrough. To accommodate the ring, the body 1604*a* of leash attachment apparatus 1604 may include an elongated tubular opening or aperture 1604*c*-a length of which lays substantially perpendicular to a length of the larger elongated cavity through opening 1604*b*-configured to receive the first terminal end of collar component 1616. On a top surface of leash attachment apparatus 1604, a costume coupler 1613 may be disposed, which is hingely attached to the body of leash attachment apparatus 1604 via flap 1612 connecting costume coupler 1613 to one of the sides of the body of leash attachment apparatus 1604. The purpose of costume coupler 1613 is to allow for the attaching or coupling of a costume piece to the collar 1602 of the leash system 1600. As is explained further below, different attachment means for coupling may be employed by costume coupler 1613, including but not limited to utilizing a magnet that is integrated into a bottom interior surface of costume coupler 1613 and a top interior surface of the body of leash attachment apparatus 1604.

FIG. 16(*h*) illustrates a top view of collar 1602, further depicting connector 1605, which includes connector components 1605*a* and 1605*b*, coupled to collar component 1616 and leash 1603, respectively. FIG. 16(*i*) illustrates a view showing leash attachment apparatus 1604 in an open configuration such that costume coupler 1613 is swung back and decoupled from the body of leash attachment apparatus 1604. From this view, it may be appreciated that magnetic components can be employed by being disposed on an interior top surface 1613*a* of body 1604*a* and an interior bottom surface 1613*b* of costume coupler 1613 attached to body 1604*a* via flap 16112.

Turning now to the next set of figures, FIG. 17(*a*)-FIG. 17(*g*) illustrate a leash attachment apparatus coupled to a portion of a leash to form a collar for a leash system in accordance with one exemplary embodiment of the present invention. More specifically, this figure shows another embodiment of collar 1602, or collar 1700 that may be used with leash system 1600. In this exemplary embodiment, collar 1700 comprises a collar component 1716, which connects to a leash (e.g. leash 1603) via a leash connector component 1705*a*, looping around to form an aperture 1716*a*, in a manner similar to that of collar 1602. In this embodiment, however, collar component 1702 is threaded through flap 1712 of leash attachment apparatus 1704, which is wide enough to allow a portion of collar component therethrough, and strong enough to sustain forces that may result from an animal pulling away. FIG. 17(*a*) illustrates a perspective view of collar 1700; FIG. 17(*b*) illustrates a top view of collar 1700, and particularly a top view of leash attachment apparatus 1704; FIG. 17(*c*) illustrates a front view of collar 1700; FIG. 17(*d*) illustrates a side view thereof, showing how a portion of collar component 1716 loops with itself to the side of itself in order to thread through the opening of flap 1712; and FIG. 17(*e*)-FIG. 17(*g*) illustrate several views showing a channel 1717 that may be included in some exemplary embodiments, for imbedding an LED strip therein.

Leash attachment apparatus 1704 comprises a substantially hollow body including an opening at one end of the body for receiving a terminal end of collar component 1716. In this exemplary embodiment, as may be appreciated especially from the top view of FIG. 17(*b*), the body of leash attachment apparatus 1704 terminates at an opposite end of the opening without any rings or additional openings. As such, collar component 1716 is configured to couple to the single opening at the first end of the body of leash attachment apparatus 1704, and instead of being threaded through a ring (as in the embodiment of FIG. 16(*a*)), a portion of collar component 1716 is threaded through the side of the body of leash attachment apparatus 1704, as mentioned above through flap 1712. As with the previous embodiment of leash attachment apparatus 1604, leash attachment apparatus 1704 includes, on a top surface of the body of leash attachment apparatus 1704, a costume coupler 1713. Costume coupler 1713 may be hingely attached to the body of leash attachment apparatus 1704 via flap 1712 connecting costume coupler 1713 to one of the sides of the body of leash attachment apparatus 1704. As mentioned above, the purpose of a costume coupler such as costume coupler 1713 is to allow for the attaching or coupling of a costume piece to the collar 1700.

Turning now to the next set of figures, FIG. 18(*a*)-FIG. 18(*g*) illustrate a leash attachment apparatus coupled to a portion of a leash to form a collar for a leash system in accordance with one exemplary embodiment of the present invention. More specifically, this figure shows another embodiment of collar 1602, or collar 1800 that may be used with leash system 1600. In this exemplary embodiment, collar 1800 comprises a collar component 1816, which connects to a leash (e.g. leash 1603) via a leash connector component 1805a, looping around to form an aperture 1816a, in a manner similar to that of collar 1602. In this embodiment, however, collar component 1802 is threaded through an opening that is situated in a mid-section of a bodu of leash attachment apparatus 1804, which is wide enough to allow a portion of collar component 1816 therethrough, and strong enough to sustain forces that may result from an animal pulling away. Because a portion of collar component 1816 passes through the body of leash attachment apparatus 1804—rather than, for example, a flap—this embodiment may be able to withstand higher forces. The various vies of this embodiment include: FIG. 18(*a*) illustrates a perspective view of collar 1800; FIG. 18(*b*) illustrates a top view of collar 1700, and particularly a top view of leash attachment apparatus 1804; FIG. 18(*c*) illustrates a front view of collar 1800; FIG. 18(*d*) illustrates a side view thereof, showing how a portion of collar component 1816 loops underneath itself and out through the opening in the mid-section of the body of leash attachment apparatus 1804; and FIG. 18(*e*)-FIG. 18(*g*) illustrate several views showing a channel 1817 that may be included in some exemplary embodiments, for imbedding an LED strip therein.

Leash attachment apparatus 1804 comprises a substantially hollow body including an opening at one end of the body for receiving a terminal end of collar component 1816. In this exemplary embodiment, as may be appreciated especially from the top view of FIG. 18(*b*), the body of leash attachment apparatus 1804 also includes a large opening through a mid-section of the body. From the side view of FIG. 18(*c*) it may also be appreciated that the body of leash attachment apparatus 1804 includes a top portion configured to couple to a bottom portion at a side section of the body of leash attachment apparatus 1804. The top portion and the bottom portion are hingely affixed to each other via flap 1812 and configured to open and close so that a portion of a costume may be sandwiched therebetween. Collar component 1816, instead of being threaded through a ring (as in the embodiment of FIG. 16(*a*)) or through a flap (as in the embodiment of FIG. 17(*a*)), is threaded through the mid-section opening of the body of leash attachment apparatus 1804. As such, instead of having a separate costume coupler, the body of leach attachment apparatus 1804 is configured to couple to a costume, by for example, implementing magnets on an interior top surface of a first component and an interior bottom surface of a second component.

Figure 19B:
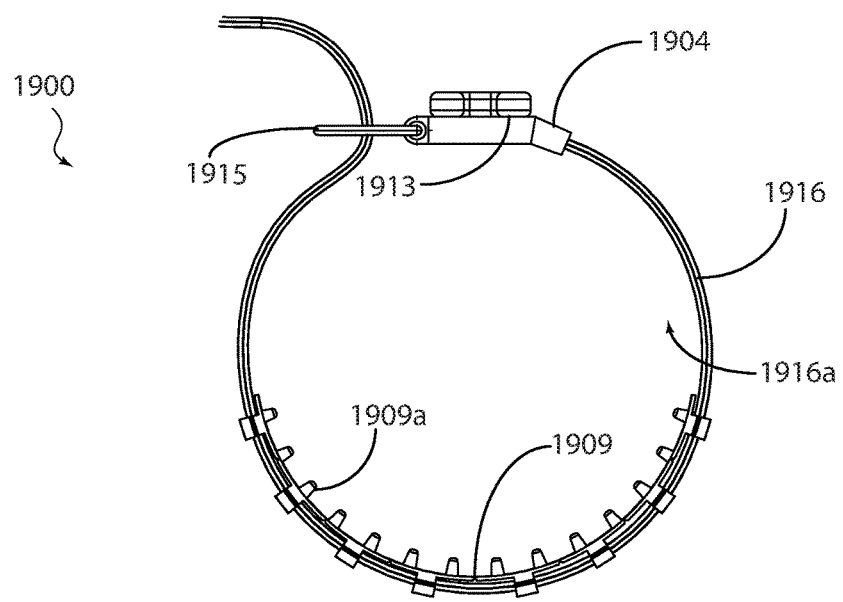

Turning now to the next set of figures, FIG. 19(*a*)-FIG. 19(*b*) illustrate a leash attachment apparatus coupled to a portion of a leash to form a collar for a leash system in accordance with one exemplary embodiment of the present invention. More specifically, the following set of figures primarily focus on leash 1900, which comprises a singular leash component that extends from the collar region 1916 to the handle. In this exemplary embodiment, the collar comprises a collar region 1916, rather than a removable collar component. The various vies of this embodiment include: FIG. 19(*a*) illustrating a perspective view of leash 1900; and FIG. 19(*b*) illustrating a front view of leash 1900, including a plurality of prongs 1909 (that serve as a so-called choke collar). In some embodiments, a set of prongs 1909 may be coupled on to collar region 1916 for training an animal. Such embodiment of removable prongs in accordance with the present invention are further discussed with reference to FIGS. 22(*a*)-22(*e*).

As mentioned above, collar region 1916 is typically a unitary piece and thus integral with the entire length of leash 1900 (only the collar region thereof shown). In exemplary embodiments, and without limiting the scope of the present invention, leash 1900 including collar region 1916 comprises a substantially flat tubular elongated body constructed of a soft silicone with an imbedded LED strip that may be connected an LED strip as shown with reference to handle 1601 for lighting. In yet other exemplary embodiments, leash 1900 including collar region 1916 excludes such LED strip, for example if such embodiment does not require or include lighting.

Collar region 1916 typically loops around itself in a manner such that aperture 1916a is formed in order to be placed around a collar of an animal or pet. Collar region 1916 may include a terminal end that is coupled to a leash attachment apparatus 1904, very similar to leash attachment apparatus 1916 in structure.

Leash attachment apparatus 1904 comprises a substantially hollow body including an opening at one end of the body for receiving a terminal end of collar component 1916. In some exemplary embodiments, such as the one shown in FIG. 19(*b*), leash attachment apparatus 1904 includes a ring 1915 at an opposite end of the opening, the ring configured to receive a second terminal end and portion of collar region 1916 therethrough. To accommodate the ring, the body of leash attachment apparatus 1904 may include an elongated tubular opening that lays perpendicular to the larger elongated opening configured to receive the first terminal end of collar component 1916. On a top surface of leash attachment apparatus 1904, a costume coupler 1913 may be disposed, which is hingely attached to the body of leash attachment apparatus 1904 via flap 1912 connecting costume coupler 1913 to one of the sides of the body of leash attachment apparatus 1904. The purpose of costume coupler 1913 is to allow for the attaching or coupling of a costume piece to the collar region 1916 of the leash 1900. As is explained further below, different means of coupling may be employed by costume coupler 1913, including but not limited to utilizing a magnet that is integrated into a bottom interior surface of costume coupler 1913 and a top interior surface of the body of leash attachment apparatus 1904. In such exemplary embodiments as shown in FIGS. 19(*a*) and 19(*b*), the leash attachment apparatus body may be flatter and more rectangular so as to properly register with the flat tubular elongated leash. This may offer a better grip and lighter construction of the entire system.

Moreover, leash attachment apparatus 1904 functions in a manner like the above embodiments of, for example FIG. 16(*i*), wherein the leash attachment apparatus opens such that a costume coupler is swung back and decoupled from the body of the leash attachment apparatus utilizing a magnetic component disposed on an interior top surface of the leash attachment apparatus 1904 and a corresponding magnetic component disposed on an interior bottom surface of the costume coupler therein.

Turning now to the next set of figures, FIG. 20(*a*)-FIG. 20(*d*) illustrate a leash attachment apparatus coupled to a portion of a leash to form a collar for a leash system in accordance with one exemplary embodiment of the present invention. More specifically, the following set of figures primarily focus on leash 2000, which comprises a singular leash component that extends from the collar region 2016 to the handle (not shown) of the device. In this exemplary embodiment, the collar comprises a collar region 2016, rather than a removable collar component, similar to the above embodiment disclosed with reference to FIG. 19(*a*)-

Figure 20A:
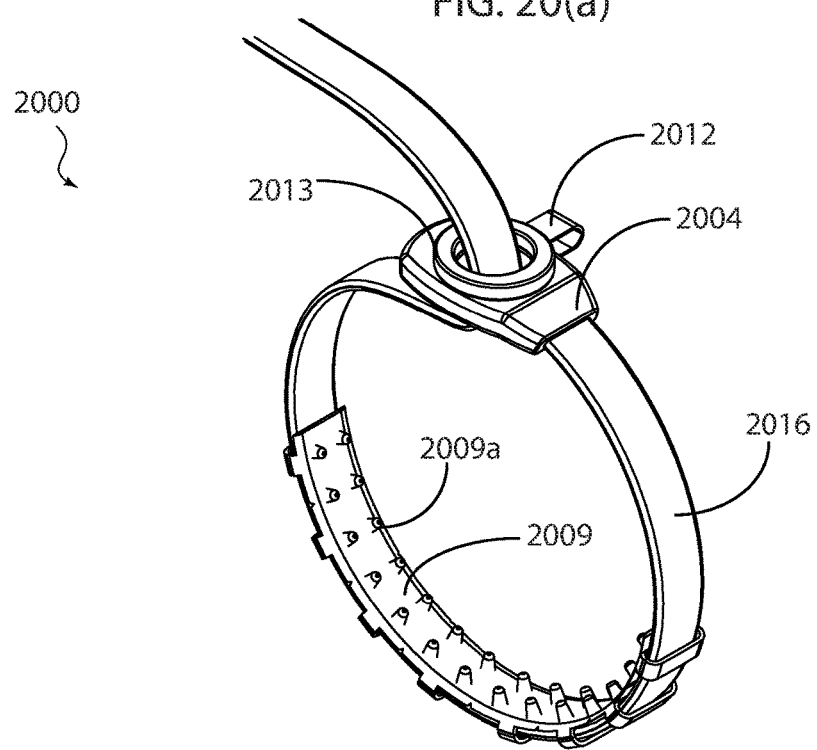
Figure 20B:
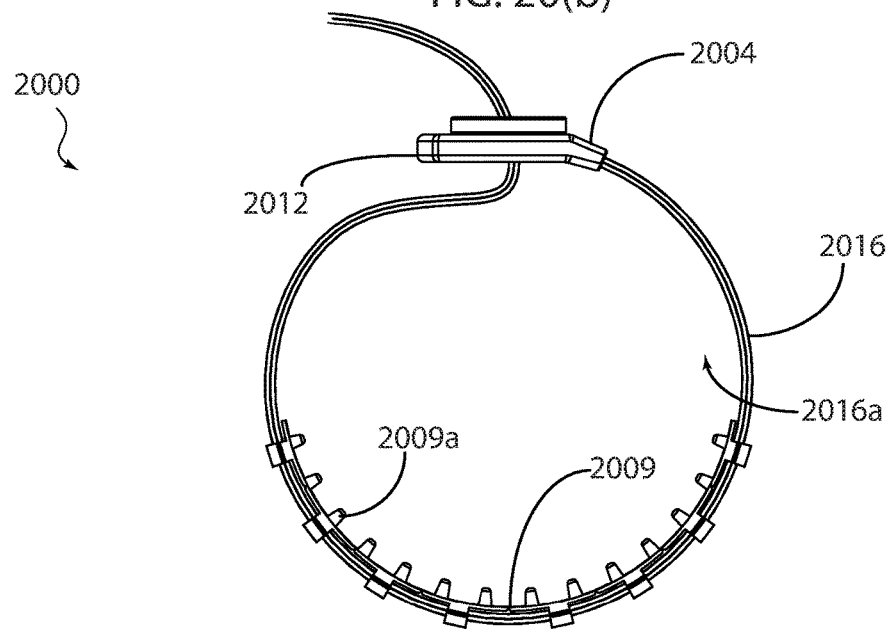

19(b). The various vies of this embodiment include: FIG. 20(a) illustrating a perspective view of leash 2000; FIG. 20(b) illustrating a front view of leash 2000, including a plurality of prongs 2009 (that serve as a so-called choke collar); FIG. 20(c) illustrating a top view thereof, FIG. 20(d) illustrating a side view thereof; and FIG. 20(e) illustrating a view showing leash attachment apparatus 2004 in an open configuration such a costume coupler 2013 is swung back and decoupled from the body of leash attachment apparatus 2004. From this view, magnetic component 2013a and 2013b may be appreciated as being disposed on an interior top surface of leash attachment component 2004 and an interior bottom surface of costume coupler 2013, respectively.

In some embodiments, a set of prongs 2009 may be coupled on to collar region 2016 for training an animal. Such embodiment of removable prongs in accordance with the present invention are further discussed with reference to FIGS. 22(a)-22(e).

In this exemplary embodiment of FIGS. 20(a)-20(d), leash 2000 comprises a collar region 2016, which is threaded through an opening that is situated in a mid-section of a body of leash attachment apparatus 2004, which is wide enough to allow a portion of collar region 2016 therethrough, and strong enough to sustain forces that may result from an animal pulling away.

Because a portion of collar region 2016 passes through the body of leash attachment apparatus 2004—rather than, for example, a flap—this embodiment may be able to withstand higher forces. Like the embodiment disclosed with reference to FIG. 18(a)-FIG. 18(g), leash attachment apparatus 2004 comprises a substantially hollow body including an opening at one end of the body for receiving a terminal end of collar region 2016. In this exemplary embodiment, as may be appreciated especially from the top view of FIG. 20(c), the body of leash attachment apparatus 2004 also includes a large opening through a mid-section of the body.

From the side view of FIG. 20(d) it may also be appreciated that the body of leash attachment apparatus 2004 includes a top portion configured to couple to a bottom portion at a side section of the body of leash attachment apparatus 2004. The top portion and the bottom portion are hingely affixed to each other via flap 2012 and configured to open and close so that a portion of a costume may be sandwiched therebetween. Collar region 2016, instead of being threaded through a ring (as in the embodiment of FIG. 16(a)) or through a flap (as in the embodiment of FIG. 17(a)), is threaded through the mid-section opening of the body of leash attachment apparatus 2004. As such, instead of having a separate costume coupler, the body of leach attachment apparatus 2004 is configured to couple to a costume, by for example, implementing magnets on an interior top surface of a first component and an interior bottom surface of a second component.

Figure 27A:
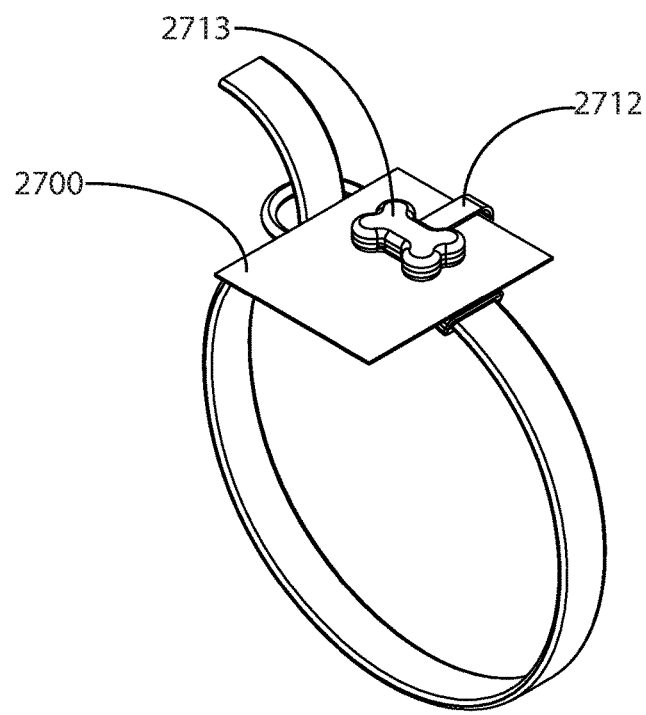
FIG. 27(a)-FIG. 27(b) illustrate how a leash system may be worn by an animal or pet along with a costume and in accordance with an exemplary embodiment of the present invention.
Figure 27B:
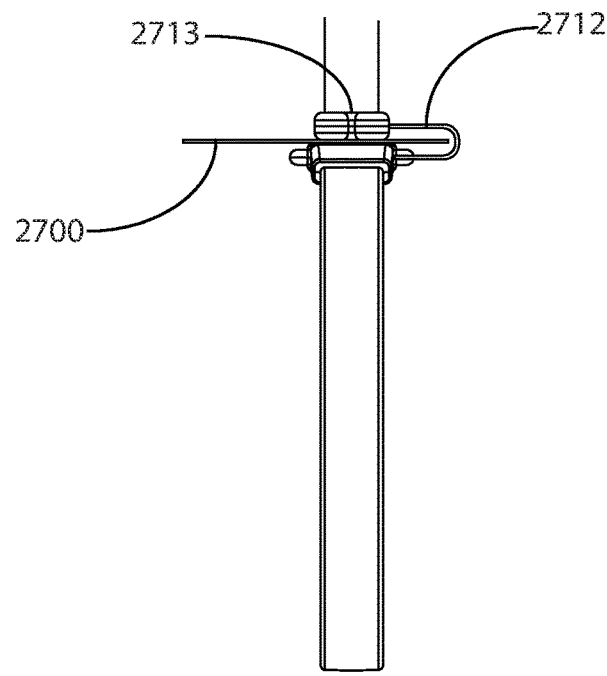

FIG. 20(d) illustrates a view showing leash attachment apparatus 2004 in an open configuration such that costume coupler 2013 is swung back and decoupled from the body of leash attachment apparatus 2004. From this view, magnetic component 2013a and 2016b may be appreciated as being disposed on an interior top surface of leash attachment component 2004 and an interior bottom surface of costume coupler 2013, respectively. FIGS. 27(a) and 27(b) illustrate how a leash system may be worn by an animal or pet along with a costume and in accordance with an exemplary embodiment of the present invention.

Figure 21A:
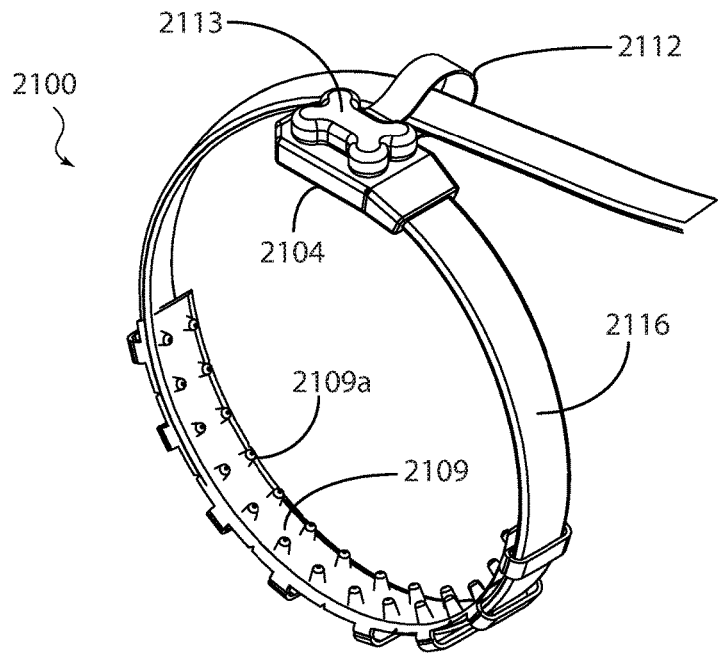
FIG. 21(a)-FIG. 21(d) illustrate a leash attachment apparatus coupled to a portion of a leash to form a collar for a leash system in accordance with one exemplary embodiment of the present invention.
Figure 21B:
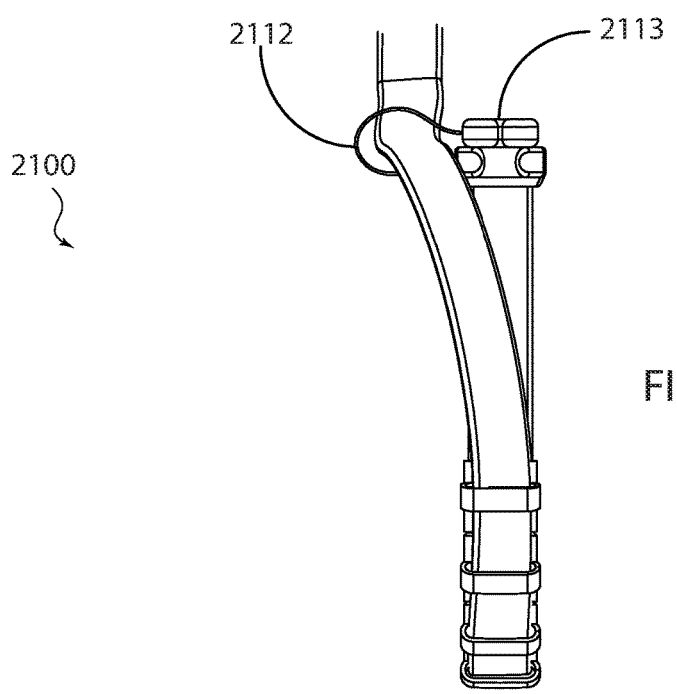
Figure 21C:
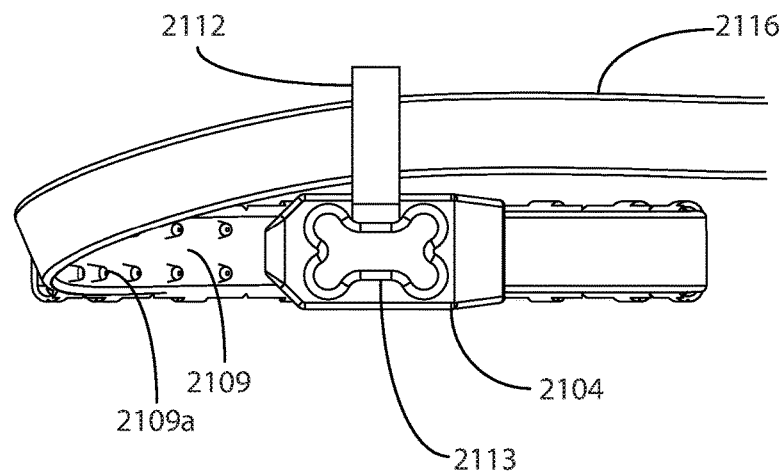
Figure 21D:
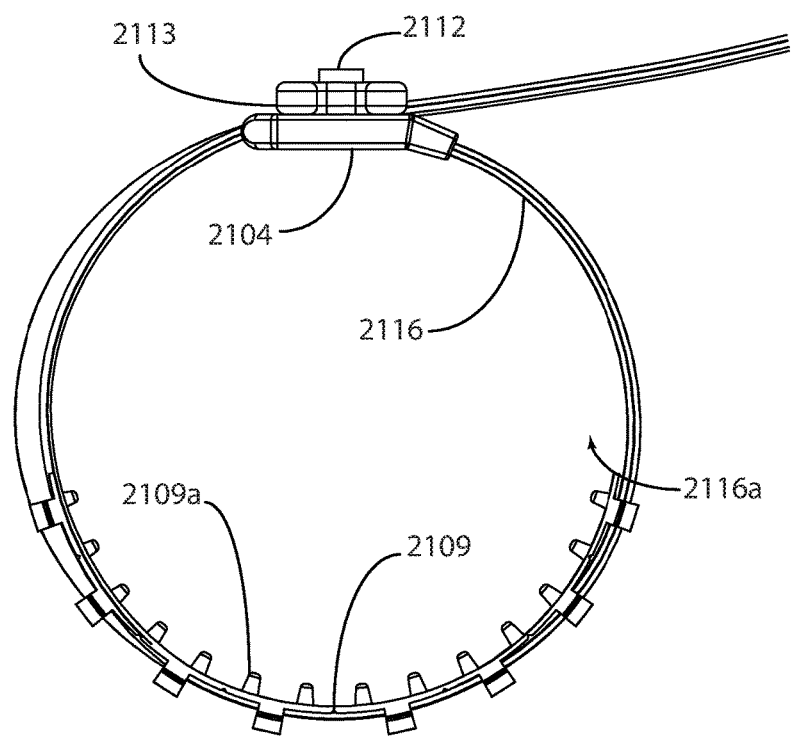

Turning now to the next set of figures, FIG. 21(a)-FIG. 21(d) illustrate a leash attachment apparatus coupled to a portion of a leash to form a collar for a leash system in accordance with one exemplary embodiment of the present invention. More specifically, the following set of figures primarily focus on leash 2100, which comprises a singular leash component that extends from the collar region 2116 to the handle. In this exemplary embodiment, collar region 2116 loops around to form an aperture 2116a, in a manner similar to that of collar 1702. In this embodiment, collar region 2116 is threaded through flap 2112 of leash attachment apparatus 2104, which is wide enough to allow a portion of collar component therethrough, and strong enough to sustain forces that may result from an animal pulling away. FIG. 21(a) illustrates a perspective view of leash 1700 and more particularly collar region 2116; FIG. 21(b) illustrates a side view thereof; FIG. 21(c) illustrates a top view of collar region 2116, and particularly a top view of leash attachment apparatus 2104; and FIG. 21(d) illustrates a side view thereof, showing how a portion of collar region 2116 loops with itself to the side of itself in order to thread through the opening of flap 2112. Although not shown in these views, a person of ordinary skill in the art may appreciate that as with previous embodiments (for example those disclosed with reference to FIGS. 17(e)-17(g), a channel may be included throughout leash 2100 for imbedding an LED strip therein.

In accordance with this embodiment, leash attachment apparatus 2104 comprises a substantially hollow body including an opening at one end of the body for receiving a terminal end of collar component 2116. In this exemplary embodiment, as may be appreciated especially from the top view of FIG. 21(c), the body of leash attachment apparatus 2104 terminates at an opposite end of the opening without any rings or additional openings. As such, collar region 2116 is configured to couple to the single opening at the first end of the body of leash attachment apparatus 2104, and collar region 2116 is threaded through the side of the body of leash attachment apparatus 2104, as mentioned above through flap 2112. As with the previous embodiment of leash attachment apparatus 1704, leash attachment apparatus 2104 includes, on a top surface of the body of leash attachment apparatus 2104, a costume coupler 2113. Costume coupler 2113 may be hingely attached to the body of leash attachment apparatus 2104 via flap 2112 connecting costume coupler 2113 to one of the sides of the body of leash attachment apparatus 2104. As mentioned above, the purpose of a costume coupler such as costume coupler 2113 is to allow for the attaching or coupling of a costume piece to the collar region 2116 of leash 2100.

The following figures, FIG. 22(a)-FIG. 22(d), illustrate a prong system for a leash system in accordance with one exemplary embodiment of the present invention. More specifically: FIG. 22(a) illustrates a top view of modular prong belt 2200; FIG. 22(b) illustrates a side view thereof; FIG. 22(c) illustrates a bottom view thereof; FIG. 22(d) illustrates a cross-sectional view thereof and FIG. 22(d) illustrates a cross-sectional view thereof, depicting a portion of modular prong belt 2200 in an open configuration.

In some exemplary embodiments, such as the one depicted in these figures, modular prong belt comprises a generally flat tubular belt body 2201 with a top surface that includes a plurality of prongs 2200 disposed throughout the top surface. Along a length of the body 2201, a plurality of leash couplers 2203 extend from the belt body 2201 downwardly and underneath the belt body 2201 each of the plurality of leash couplers 2203 having a hinged portion 2204 and a fastening portion 2205 that may be opened and closed such that a user may couple modular prong belt 2200 onto a leash in accordance with the present invention. Moreover, it is envisioned that in some embodiments of the present invention, different sizes of modular prong belt 2200 may be provided so as to accommodate different size animals, and kits in accordance with he present invention may include smaller components of modular prong belt 2200 to enlarge a coverage area of a leash depending on the user's needs.

Figure 23:
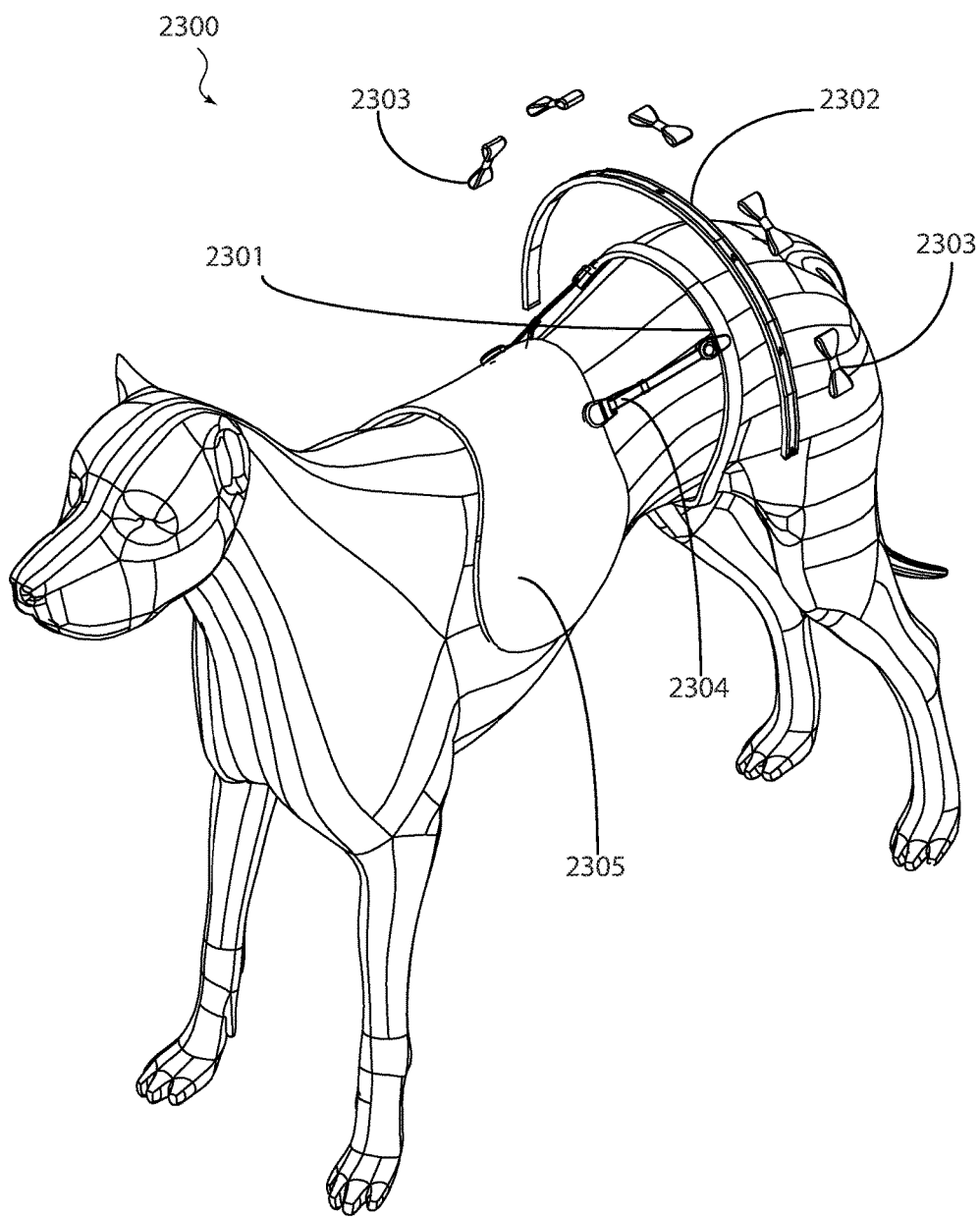
FIG. 23 illustrates a suspender system for use with a costume in accordance with one exemplary embodiment of the present invention.
Figure 24A:
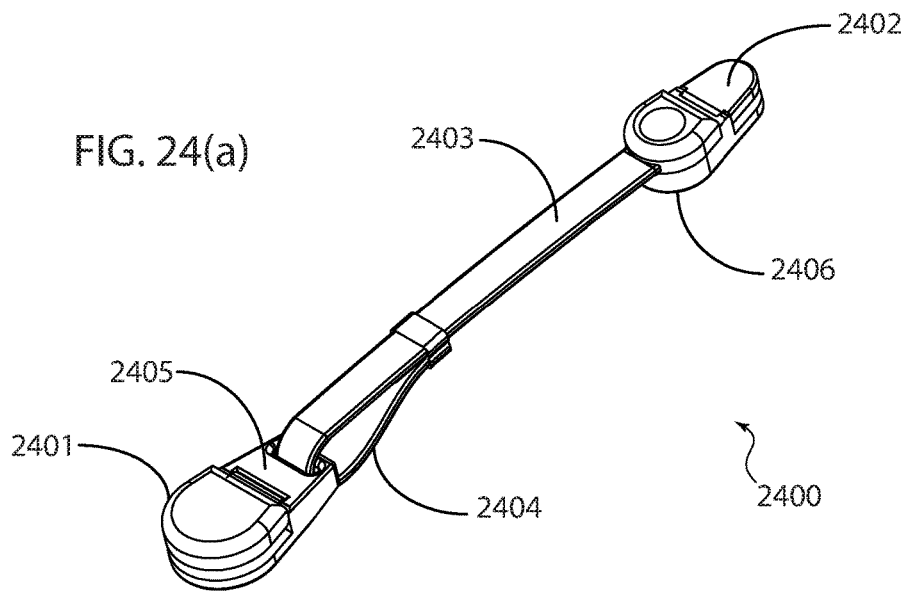
FIG. 24(a)-FIG. 24(f) illustrate suspenders for use with a suspender system in accordance with one exemplary embodiment of the present invention.
Figure 24B:
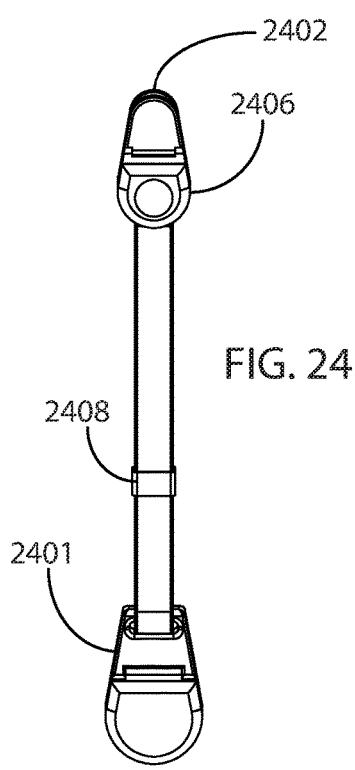
Figure 24C:
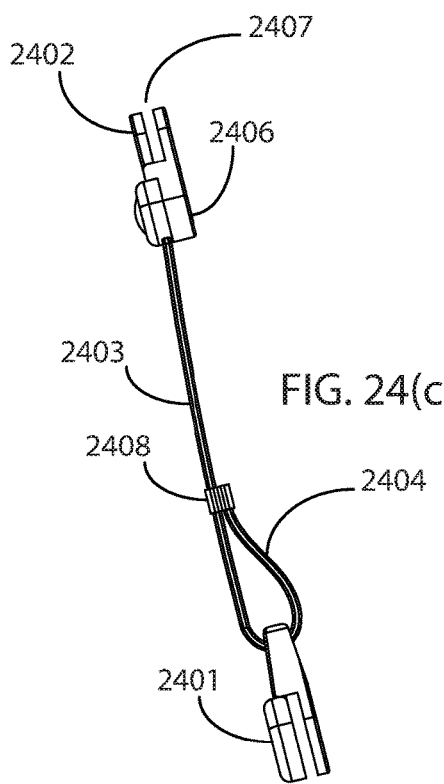
Figure 24D:
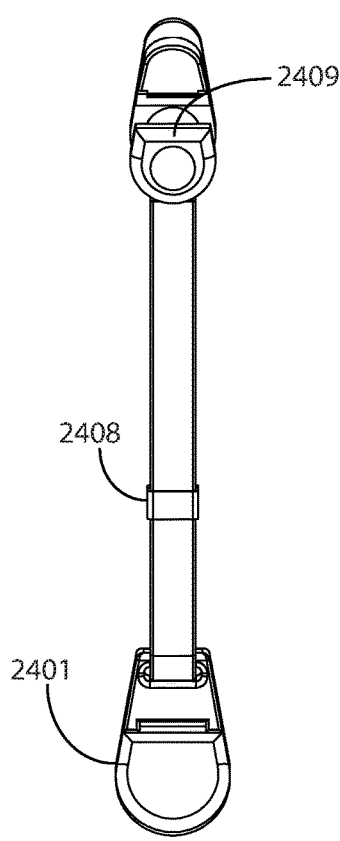
Figure 24E:
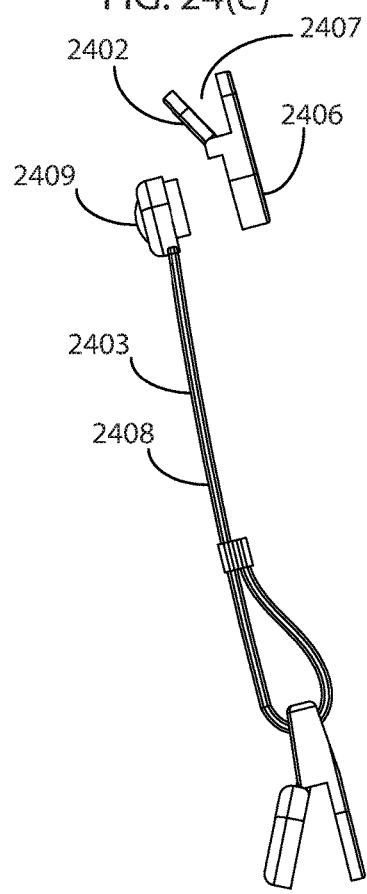
Figure 24F:
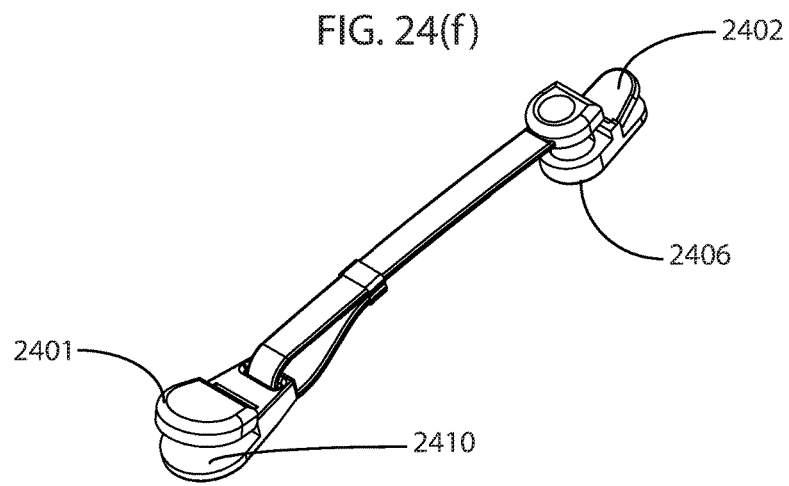

Now turning to the next figure, FIG. 23 illustrates a suspender system for use with a costume in accordance with one exemplary embodiment of the present invention. More specifically, FIG. 23 depicts suspender system 2300, which comprises a skirt band 2301, an accessory attachment belt 2302 having a magnetic strip for magnetically coupling one or more decorative pieces 2304, and a plurality of suspender straps 2304 for coupling the skirt band 2301 to a costume piece or harness 2305 worn by the animal or pet.

FIG. 24(a)-FIG. 24(f) illustrate suspenders for use with a suspender system in accordance with one exemplary embodiment of the present invention. More specifically, these figures depict a single suspender 2400 in accordance with an exemplary embodiment of the suspenders for suspender straps 2305. In such exemplary embodiment, each suspender 2400 may include a first clip 2401, which may be a harness clip suitable for attaching the suspender 2400 to a harness, a second clip 2402, which may be a skirt band clip suitable for attaching the suspender 2400 to a skirt band such as skirt band 2301, and a suspender strap 2403, which in exemplary embodiments may comprise of a translucent or semitransparent material and include a channel disposed therein with an LED strip.

In exemplary embodiments wherein, each suspender includes an LED strip imbedded within the suspender strap, one of the fasteners—for example clip 2402—may include a small circuitry and battery configured to turn on and off the LED strip disposed therein, for example in a separate but coupled housing 2409. Housing 2409 may be attached to a clasp body 2406, which includes a clip mechanism 2407. The clip mechanism 2407 may include a plastic clip or another clipping or fastening means that may be easily washable and thus waterproof or water-resistant so that each component is easy to clean; or may include magnets or another type of fastening means such as loop-and-hook devices including Velcro®. Opposite to the housing 2409 hosing the control circuitry for the LED strip, first clip 2401 may include a clip loop for receiving a portion 2404 of suspender strap 2403, which may be lengthened or shortened via a typical latch 2408. In some exemplary embodiments, a surface of one or more of the clips 2401 and 2402, may include magnetic components 2410 on interior surfaces of the clips such that the clips latch on magnetically.

Figure 25:
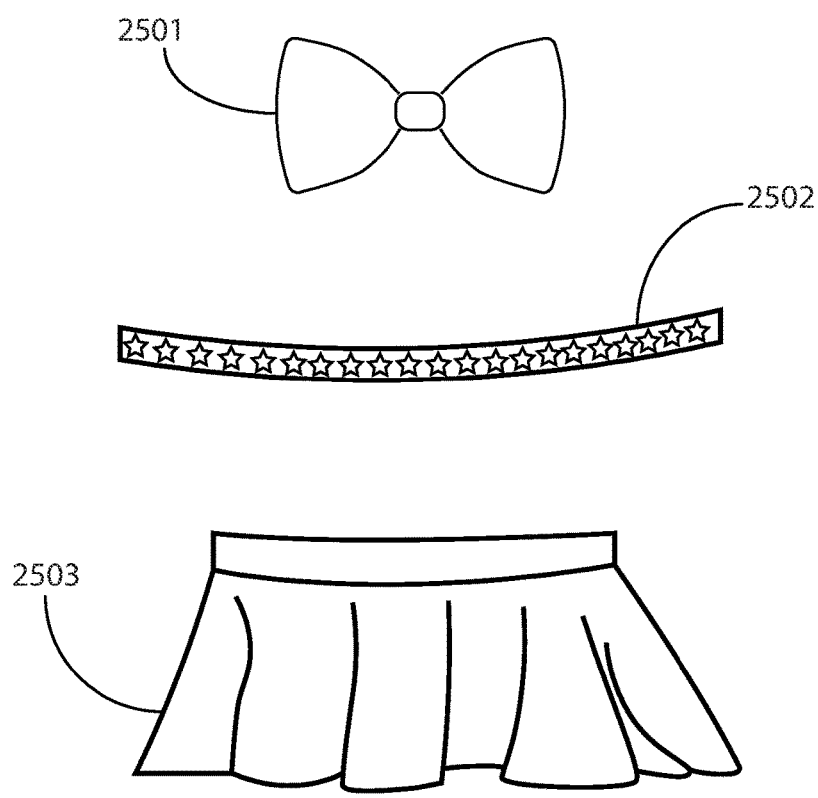
FIG. 25 illustrates several costume items in accordance with one exemplary embodiment of the present invention.

Now turning to the next figure, FIG. 25 illustrates several costume items in accordance with one exemplary embodiment of the present invention. More specifically, several costume accessories may include a bow 2501, a decorative belt or strap 2502 and a skirt or tutu 2503, which may be provided with a magnetic component for magnetically coupling to an accessory attachment belt having a magnetic strip for magnetically coupling one or more decorative pieces (e.g. see FIG. 23).

Figure 26A:
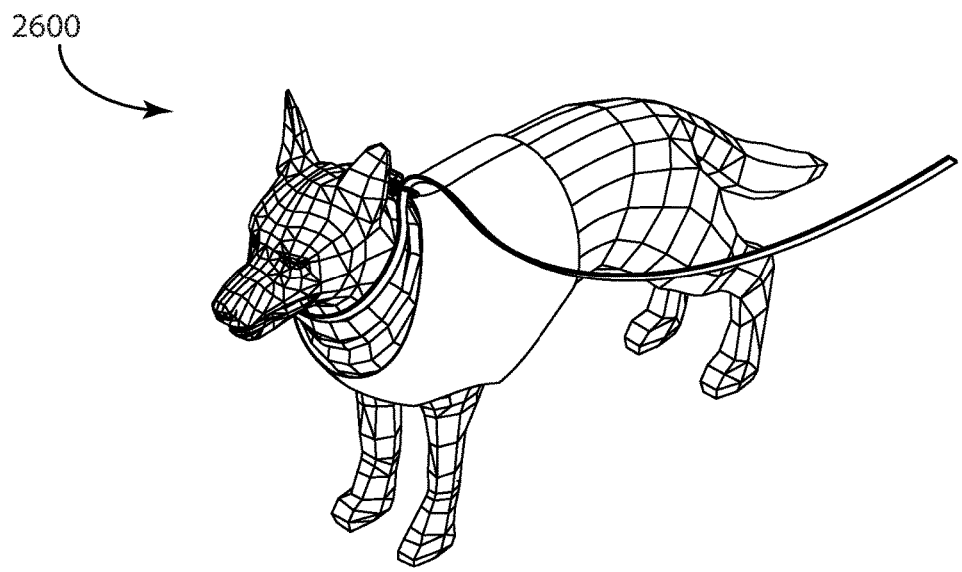
FIG. 26(a)-FIG. 26(b) illustrate how a leash system may be worn by an animal or pet along with a costume and in accordance with an exemplary embodiment of the present invention.
Figure 26B:
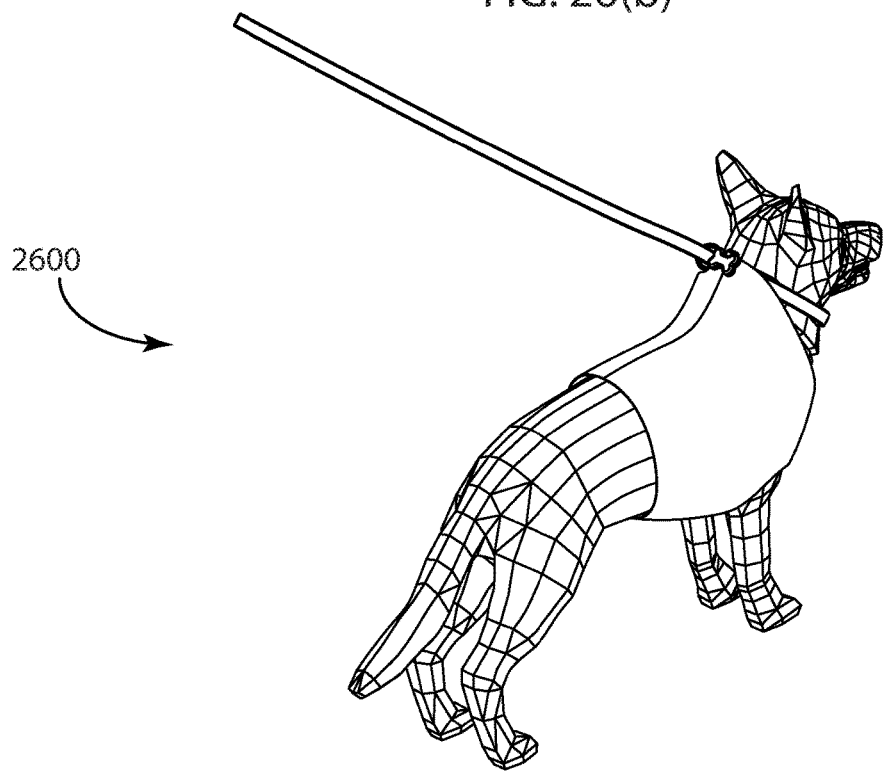

FIG. 26(a)-FIG. 26(b) illustrate how a leash system may be worn by an animal or pet along with a costume and in accordance with an exemplary embodiment of the present invention, wherein FIG. 26(a) is a front-perspective view, and FIG. 26(b) is a back-perspective view.

FIG. 27(a)-FIG. 27(b) illustrate how a leash system may be worn by an animal or pet along with a costume and in accordance with an exemplary embodiment of the present invention. More specifically, FIG. 27(a) depicts show how a cloth 2700 may be secured to a leash attachment apparatus 2713 having a flap 2712. Of course, the cloth 2700 is illustrative of for example a costume portion that may be coupled to the animal leash. FIG. 27(b) is a side view thereof.

Figure 28A:
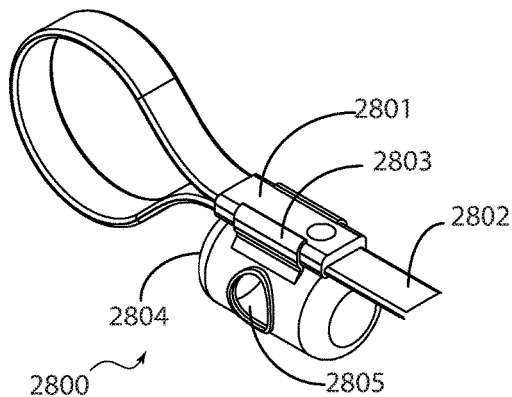
FIG. 28(a)-FIG. 28(e) illustrate a leash handle and auxiliary housing in accordance with an exemplary embodiment of the present invention.
Figure 28B:
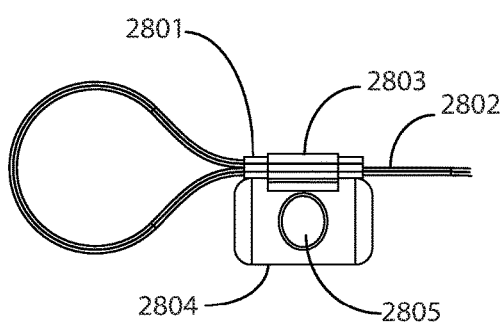
Figure 28C:
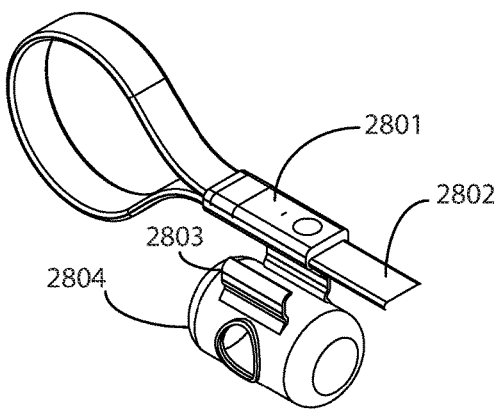
Figure 28D:
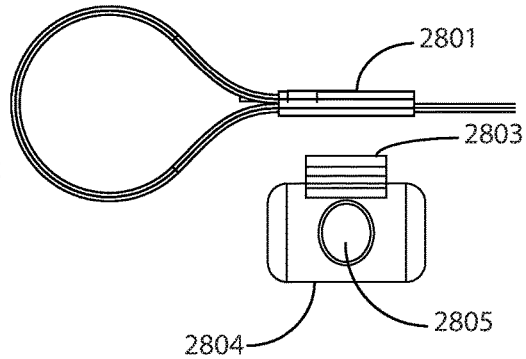
Figure 28E:
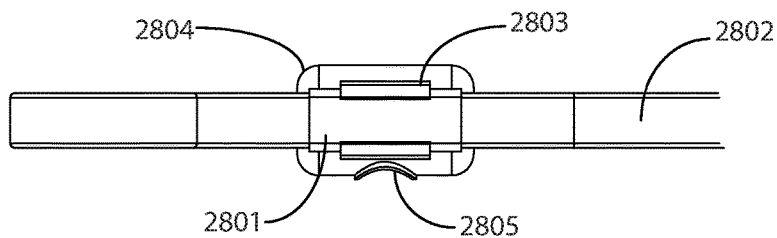

Turning now to the next set of figures, several exemplary embodiments for a handle are disclosed in accordance with the present invention. FIG. 28(a)-FIG. 28(e) illustrate a leash handle and auxiliary housing in accordance with an exemplary embodiment of the present invention. More specifically, FIG. 28(a) illustrates a perspective view of leash handle 2800; FIG. 28(b) illustrates a side view of leash handle 2800; FIG. 28(c) illustrates an exploded perspective view of leash handle 2800; FIG. 28(d) illustrates an exploded side view of leash handle 2800; and FIG. 28(e) illustrates a top view of a handle 2800. Handle 2800 generally comprises of a first housing 2801 coupled directly to leash 2802, wherein a portion of leash 2801 traverses the housing 2803. In some exemplary embodiments, this first housing 2801 may include a control circuitry for controlling an LED strip imbedded within a channel of leash 2802. In alternative embodiments, housing 2801 does not include a control circuitry and is a much simpler device wherein leash 2802 does not include an LED strip or the like. Moreover, handle 2800 may further comprise a second housing 2804, that may be a tubular housing having a cavity therein with an opening on the side of the housing 2804 for holding auxiliary items such as waste plastic bags, or other items that an animal or pet owner may desire to carry around while walking their pet. In exemplary embodiments of handle 2800, the first housing may be removable or detachable from the second housing, so as to allow a user to optionally utilize a lighter or heavier load depending on the requirements during use. To these ends, a coupling component 2803 may be included with the second housing, such that a clip or similar attachment means extend from the second housing and are adapted to receive the first housing therein between.

Figure 29A:
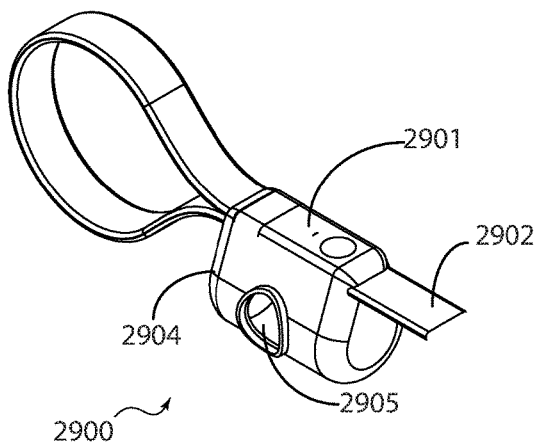
FIG. 29(a)-FIG. 29(c) illustrate a leash handle and auxiliary housing in accordance with an exemplary embodiment of the present invention.
Figure 29B:
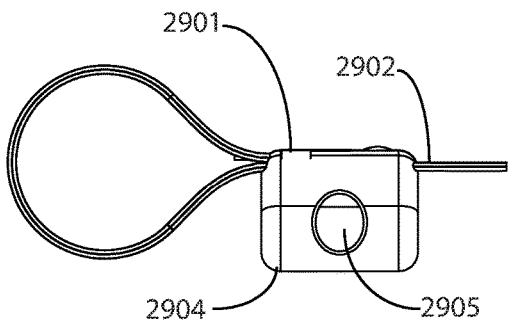
Figure 29C:
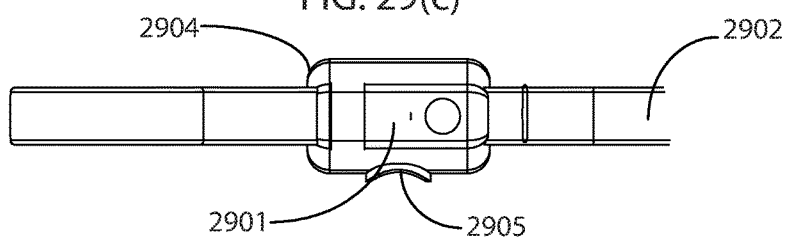

Turning to the next embodiment, FIG. 29(a)-FIG. 29(c) illustrate a leash handle 2900 including an integral auxiliary housing 2904 in accordance with an exemplary embodiment of the present invention. More specifically, FIG. 29(a) illustrates a perspective view of leash handle 2900; FIG. 29(b) illustrates a side view of leash handle 2900; and FIG. 28(c) illustrates top view of leash handle 2900. Handle 2900 generally comprises of a single housing 2901 coupled directly to leash 2902, wherein a portion of leash 2902 traverses the housing 2804. In some exemplary embodiments, housing 2901 may include a control circuitry for controlling an LED strip imbedded within a channel of leash 2902. In alternative embodiments, housing 2901 does not include a control circuitry. Moreover, housing 2901 may comprise a tubular housing having a cavity therein with an opening 2905 on the side of the housing 2904 for holding auxiliary items such as waste plastic bags, or other items that an animal or pet owner may desire to carry around while walking their pet.

Figure 30A:
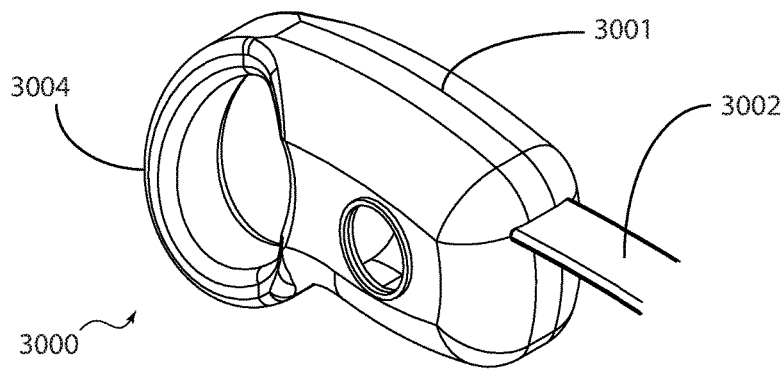
FIG. 30(a)-FIG. 30(c) illustrate a retractable leash handle in accordance with an exemplary embodiment of the present invention.
Figure 30B:
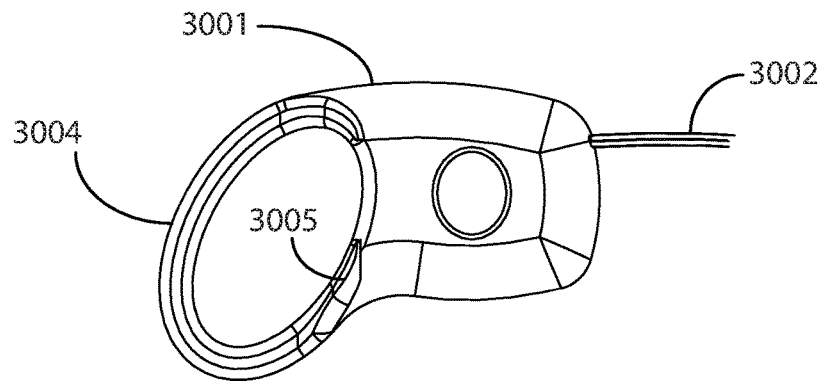
Figure 30C:
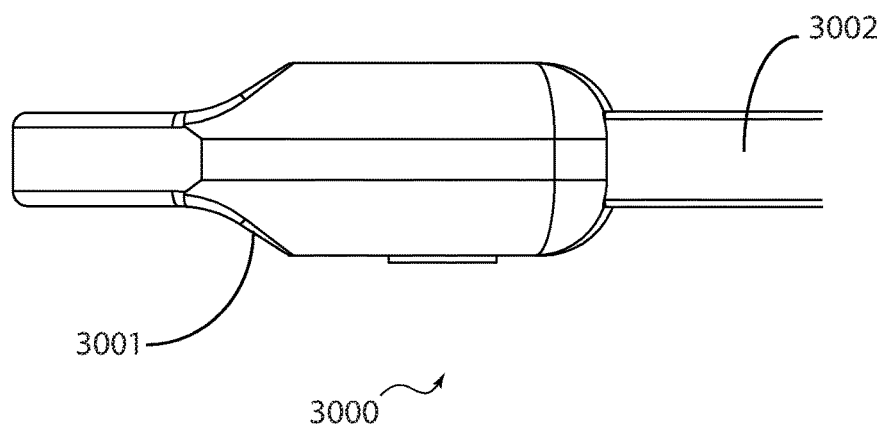

Turning now to the last set of figures, FIG. 30(a)-FIG. 29(c) illustrate a retractable leash handle in accordance with an exemplary embodiment of the present invention. More specifically, FIG. 30(a) illustrates a perspective view of leash handle 3000; FIG. 30(b) illustrates a side view of leash handle 3000; and FIG. 30(c) illustrates top view of leash handle 3000. Handle 3000 generally comprises of a single housing 3001 coupled directly to leash 3002, wherein a portion of leash 3002 is reeled inside the housing 3001, the housing including a retractable system that will be apparent to a person of ordinary skill in the art.

An animal leash and costume kit has been described. Although the primary application of the above described components of a kit are described as for use with animal costumes and the like, other uses are envisioned without deviating from the scope of the present disclosure, including but not limited to adult costumes, props and the like.

The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

DESCRIPTION OF THE REFERENCE SYMBOLS

- 100. Leash and Costume Kit
- 101. First suspender strap
- 102. Second suspender strap
- 103. First buckle
- 104. Decorative piece
- 105. Costume
- 106. First crosspiece
- 107. Third suspender strap
- 201. Second buckle
- 202. Third buckle
- 203. Leash attachment member
- 204. Upper exterior surface of leash attachment member
- 301. Leash
- 302. First leash attachment loop
- 303. Second leash attachment loop
- 401. First male buckle member
- 402. First female buckle member
- 403. Second male buckle member
- 404. Second female buckle member
- 405. Third male buckle member
- 406. Third female buckle member
- 501. Leash attachment member
- 502. First removable leash attachment loop
- 503. Second removable leash attachment loop
- 504. Decoration attachment member
- 505. First loop connector
- 506. Second loop connector
- 601. Leash attachment
- 602. First removable leash attachment loop
- 603. Second removable leash attachment loop
- 604. Decoration attachment member
- 605. First loop connector
- 606. Second loop connector
- 701. Leash attachment
- 702. First removable leash attachment loop
- 703. Second removable leash attachment loop
- 704. First suspender strap
- 705. Second suspender strap
- 706. First loop connector
- 707. Second loop connector
- 801. Leash attachment
- 802. First removable leash attachment loop
- 803. Second removable leash attachment loop
- 804. Decoration attachment member
- 805. First removable loop connector
- 806. Second removable loop connector
- 807. Horizontal axis
- 808. Ends of leash attachment member
- 809. Body of leash attachment member
- 901. Leash attachment
- 902. First loop connector
- 903. Second loop connector
- 1001. Leash attachment
- 1002. First removable leash attachment loop
- 1003. Second removable leash attachment loop
- 1004. First removable loop connector
- 1005. Second removable loop connector
- 1101. Leash attachment
- 1102. First removable leash attachment loop
- 1103. Second removable leash attachment loop
- 1104. First removable loop connector
- 1105. Central vertical axis
- 1201. Collar
- 1202. Leash
- 1301. Collar concealer
- 1302. Collar fastener
- 1600. Leash system
- 1601. Handle
- 1602. Collar
- 1603. Leash
- 1604. Leash attachment apparatus
- 1605. Leash connector
- 1606. Handle connector
- 1607. Controller
- 1608. Handle component
- 1608a. Aperture
- 1609. Prong belt
- 1609a. Prongs
- 1610. Channel
- 1611. Button(s)
- 1612. Flap
- 1613. Costume coupler
- 1613a. Magnet
- 1613b. Magnet
- 1614. Leash attachment apparatus
- 1615. Ring
- 1616. Collar component (of leash)
- 1616a. Aperture
- 1700. Leash
- 1704. Leash attachment apparatus
- 1712. Flap
- 1713. Costume Coupler
- 1715a. Leash Coupler
- 1716. Leash
- 1717. Channel
- 1800. Leash
- 1804. Leash attachment apparatus
- 1812. Flap
- 1813. Costume Coupler
- 1815a. Leash Coupler
- 1816. Leash
- 1817. Channel
- 1900. Leash
- 1904. Leash attachment apparatus
- 1909. Prong belt
- 1909a. Prongs
- 1912. Flap
- 1913. Costume Coupler
- 1915. Ring
- 1916. Leash
- 1916a. Aperture
- 2000. Leash
- 2004. Leash attachment apparatus 2009. Prong belt
2009a. Prongs
2012. Flap
2013. Costume Coupler
2013a. Magnet
2013b. Magnet
2015. Ring
2016. Leash
2016a. Aperture
2100. Leash
2104. Leash attachment apparatus
2109. Prong belt
2109a. Prongs
2112. Flap
2113. Costume Coupler
2016. Collar component
2016a. Aperture
2200. Modular prong belt
2201. Belt body
2202. Prongs
2203. Leash couplers
2204. Hinged portion
2205. Fastening portion.
2300. Suspender system
2301. Skirt band
2302. Accessory attachment belt
2303. Decorative pieces
2304. Suspender straps
2305. Costume piece or harness
2400. Suspender
2401. Clip
2402. Clip
2403. Strap
2404. Suspender strap portion
2406. Clasp body
2407. Clip mechanism
2408. Latch
2409. Housing
2410. Magnetic component
2501. Bow
2502. Strap
2503. Skirt
2600. Pet utilizing animal leash and costume kit
2700. Cloth or fabric portion
2712. Flap
2713. Costume coupler.

What is claimed is:

1. A leash attachment apparatus, comprising:
a body including a cavity with an opening at a first terminal end of the body, the opening configured to receive a terminal end of a leash;
a ring coupled to a tubular elongated aperture situated at a second terminal end of the body, the tubular elongated aperture oriented perpendicular to the opening on the first terminal end of the body; and
a costume coupler hingely attached to a side wall of the body, the side wall adjacent to the opening and the ring, wherein the costume coupler comprises an attachment means disposed along an inner surface of the costume coupler for securing a costume portion therein.

2. The apparatus of claim 1, wherein the attachment means of the costume coupler includes a first magnetic component disposed along an inner bottom surface and a second magnetic component disposed along an inner top surface.

3. The apparatus of claim 1, wherein the attachment means of the costume coupler includes a first hook-and-loop component disposed along an inner bottom surface and a second hook-and-loop component disposed along an inner top surface.

4. The apparatus of claim 1, further comprising a flap that hingely connects the costume coupler to the body.

5. The apparatus of claim 1, wherein body is a substantially flat body and the leash is a substantially flat tubular leash.

6. The apparatus of claim 1, further comprising a silicone layer disposed over the body.

7. The apparatus of claim 1, further comprising a silicone layer disposed over the leash.

8. The apparatus of claim 1, wherein the leash includes a channel in which an LED strip is disposed.

9. A leash system, comprising:
a handle;
a leash coupled to the handle at a first terminal end of the leash; and
a leach attachment apparatus coupled to a second terminal end of the leash, the leash attachment apparatus, comprising:
a body including a cavity with an opening at a first terminal end of the body, the opening configured to receive a terminal end of a leash;
a ring coupled to a tubular elongated aperture situated at a second terminal end of the body, the tubular elongated aperture oriented perpendicular to the opening on the first terminal end of the body; and
a costume coupler hingely attached to a side wall of the body, the side wall adjacent to the opening and the ring, wherein the costume coupler comprises an attachment means disposed along an inner surface of the costume coupler for securing a costume portion therein.

10. The system of claim 9, wherein the leash includes a channel in which an LED strip is disposed.

11. The system of claim 10, wherein the handle includes a control circuitry to control the LED strip disposed within the channel of the leash.

12. The system of claim 9, further comprising a modular prong belt removably coupled to a collar portion of the leash.

13. The system of claim 12, wherein the modular prong belt includes:
a plurality of prongs protrudin from a top surface of the modular prong belt; and
a plurality of leash couplers extending from sides of the modular prong belt downwardly and underneath the top surface of the modular prong belt.

14. The system of claim 9, wherein the attachment means of the costume coupler includes a first magnetic component disposed along an inner bottom surface and a second magnetic component disposed along an inner top surface.

15. The system of claim 9, wherein the attachment means of the costume coupler includes a first hook-and-loop component disposed along an inner bottom surface and a second hook-and-loop component disposed along an inner top surface.

16. The system of claim 9, wherein the attachment apparatus further comprises a flap that hingely connects the costume coupler to the body.

17. The system of claim 9, wherein body is a substantially flat body and the leash is a substantially flat tubular leash.

18. The system of claim 9, further comprising a silicone layer disposed over the body.

19. The system of claim 9, further comprising a silicone layer disposed over the leash.

20. A leash attachment apparatus, comprising:
a substantially flat body including a cavity with an opening at a first terminal end of the body, the opening configured to receive a terminal end of a flat tubular leash;
a ring coupled to a tubular elongated aperture situated at a second terminal end of the body, the tubular elongated aperture oriented perpendicular to the opening on the first terminal end of the body; and
a costume coupler including a flap that hingely connects the costume coupler to the body, a first terminal end of the flap attached to the costume coupler and a second terminal end attached to a side wall of the body, the side wall of the body adjacent to the opening and the ring, wherein the costume coupler comprises a first magnetic component disposed along an inner bottom surface and a second magnetic component disposed along an inner top surface.

\* \* \* \* \*